(12) United States Patent  
Nakajo

(10) Patent No.: US 6,925,042 B2  
(45) Date of Patent: Aug. 2, 2005

(54) OPTICAL RECORDING METHOD PERFORMING POWER CONTROL WITH VARIABLE LINEAR VELOCITY

(75) Inventor: Yukihisa Nakajo, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 695 days.

(21) Appl. No.: 09/871,123

(22) Filed: May 31, 2001

(65) Prior Publication Data

US 2002/0181365 A1 Dec. 5, 2002

(30) Foreign Application Priority Data

May 31, 2001 (JP) ...................................... 2000-162895

(51) Int. Cl.[7] .............................................. G11B 7/00
(52) U.S. Cl. .................. 369/47.53; 369/47.1; 369/53.1; 369/59.1
(58) Field of Search ............................ 369/47.1, 47.11, 369/47.15, 47.28, 47.5, 47.51, 47.52, 47.53, 47.55, 53.1, 53.11, 53.41, 59.1, 59.11, 59.12, 59.21, 59.25, 116

(56) References Cited

U.S. PATENT DOCUMENTS

| | | | |
|---|---|---|---|
| 5,485,449 A | * | 1/1996 | Nakajo .................... 369/59.11 |
| 5,502,702 A | | 3/1996 | Nakajo ........................ 369/58 |
| 5,587,975 A | * | 12/1996 | Kobayashi ............... 369/13.02 |
| 5,818,808 A | | 10/1998 | Takada et al. .............. 369/116 |
| 5,848,043 A | | 12/1998 | Takada et al. .............. 369/116 |
| 6,026,068 A | * | 2/2000 | Obata et al. ............... 369/53.2 |

* cited by examiner

Primary Examiner—Muhammad Edun  
(74) Attorney, Agent, or Firm—Pillsbury Winthrop Shaw Pittman LLP

(57) ABSTRACT

An optical disk recording method performs recording of data at a variable linear velocity multiplication factor in accordance with a radial position of a irradiation optical beam on an optical disk. The method is carried out by the steps of performing an actual recording with a variable writing power $y=ax+b$ of the irradiation optical beam in accordance with a linear velocity multiplication factor $x$ where the constant a is determined to a fixed value according to a type of the optical disk, performing a test recording before starting the actual recording such that the test recording is carried out with a test linear velocity multiplication factor to obtain an appropriate writing power of the irradiation optical beam, and setting the constant b by solving the function $y=ax+b$ with using the results of the test recording, whereby the actual recording can be performed with an appropriate writing power y calculated based on the function $y=ax+b$ having the set constants a and b.

67 Claims, 19 Drawing Sheets

(DISK C)

(DISK C)

US 6,925,042 B2

OPTICAL RECORDING METHOD PERFORMING POWER CONTROL WITH VARIABLE LINEAR VELOCITY

BACKGROUND OF THE INVENTION

The present invention relates to a recording method and recording apparatus of a recordable optical disk such as a CD-R (CD recordable) disk, a DVD-R (DVD recordable) disk and others for controlling a correction quantity of a recording strategy concerning an irradiation time of an optical beam to an appropriate value, and for controlling an optical beam to an appropriate writing power to enable recording with a high quality level in case of recording with a variable linear velocity multiplication factor in accordance with a radial position of the optical beam On an optical disk in the radial direction.

As a recording method of a constant linear velocity (CLV) recording type optical disk such as CD-R or a DVD-R, high-speed recording for recording at a linear velocity higher than a standard linear velocity (nominal reference speed) may be adopted.

In constant linear velocity recording, a number of rotations of a spindle motor increases as a recording position moves toward an inner peripheral side of the optical disk. In particular, this tendency is prominent in case of high-speed recording, and a number of rotations reaches 8000 rpm or a higher number on the innermost periphery in case of, for example, a 16-fold speed. Therefore, in recording on the inner peripheral side of the disk, the self-excited vibration of a drive mechanism becomes large (in case of a disk having the mass eccentricity in particular), and the pit formation becomes unstable. Further, when performing so-called on-the-fly writing at a high speed, by which writing of data is carried out from another CD-ROM drive to a CD-R drive without temporarily creating an image file in a hard disk, there is a method for performing high-speed reproduction of the CD-ROM drive at a constant angular velocity (CAV) and high-speed recording of the CD-R drive at a constant linear velocity, thereby carrying out the recording. At this moment, however, the linear velocity of the CD-ROM drive subjected to the CAV reproduction is approximately 32-fold speed on the outer peripheral side but approximately only 16-fold speed on the inner peripheral side. Data transfer is too late for reproduction on the inner peripheral side, and so-called buffer under-run occurs, which may lead to a failure of writing.

As a method for solving these problems, there can be considered a method by which recording of CD-R is carried out at CAV on the inner peripheral side and at CLV on the outer peripheral side as shown in FIG. 2. That is, CAV recording is started at a number of rotations that a linear velocity corresponds to, for example, a 12-fold speed at the innermost peripheral position in a program area of the optical disk. When the linear velocity reaches, e.g., a 16-fold speed with this number of rotations, CLV recording is thereafter carried out at the 16-fold speed. By switching CAV recording and CLV recording in this manner, a maximum number of rotations is suppressed to restrain the self-excited vibration, and a failure of on-the-fly writing can be avoided.

As described above, since the linear velocity varies at the time of CAV recording in the method for performing the recording by switching CAV recording and CLV recording, an appropriate writing power of a writing optical beam sequentially changes. Furthermore, as a recording strategy concerning an irradiation time of a writing optical beam, there is used a function $(n+k)T$ where T: a time corresponding to a unit pit length, n: a multiple number (integer number) of a pit length to be formed relative to the unit pit length, and k: a correction quantity.

However, an appropriate value of the correction quantity k also changes according to the linear velocity at the time of the recording.

SUMMARY OF THE INVENTION

In view of the above-described problems, it is an object of the present invention to provide an optical disk recording method and an optical disk recording apparatus for controlling the correction quantity of the recording strategy concerning an irradiation time of an optical beam at each time point, and controlling an optical beam to an appropriate writing power so as to enable the recording at a high quality level in case of performing the recording with a variable linear velocity multiplication factor in accordance with a radial position of the optical beam on an optical disk.

According to the present invention, there is provided an optical disk recording method for performing recording of data on an optical disk by controlling an irradiation time $(n+k)T$ of a writing optical beam to form a pit length corresponding to the data, where T: a time corresponding to a unit pit length;

n: a multiple number (integer number) of the pit length to be formed relative to the unit pit length; and k: a correction quantity wherein the method comprises the steps of recording data while varying a linear velocity multiplication factor of the optical disk, increasing a power of the writing optical beam as the linear velocity multiplication factor rises, changing a value of the correction quantity k in accordance with the linear velocity multiplication factor when the same is less than a predetermined critical linear velocity multiplication factor, and fixing a value of the correction quantity when the linear velocity multiplication factor is not less than the predetermined critical linear velocity multiplication factor. That is, according to experiments conducted by the present inventor, as will be described later, it was found that, in case of increasing a writing power of an optical beam as a writing linear velocity multiplication factor is raised, a value of a correction quantity k with which an excellent reproduction signal quality level can be obtained greatly varies in an area in which the recording linear velocity is relatively low and become substantially constant in an area in which the recording linear velocity is relatively high. Thus, in the present invention, with a predetermined linear velocity multiplication factor as a boundary, a value of the correction quantity k is changed in accordance with a linear velocity multiplication factor in case of less than that velocity multiplication factor and a value of the correction quantity k is fixed in case of not less than that velocity multiplication factor in order to effect the recording. As a result, recording at a high quality level is enabled. In this case, it was discovered that, although depending on types of optical disks (a difference in pigments used, a difference in manufacturers and others), the linear velocity multiplication factor as the boundary can be set to a multiplication factor of generally not less than an eight-fold speed (for example, an eight-fold speed, a ten-fold speed and more).

According to the present invention, in case of effecting recording by changing the linear velocity only not less than the linear velocity multiplication factor as the boundary, the correction quantity k can be fixed at a constant value to execute recording. Moreover, when recording with a variable linear velocity multiplication factor in accordance with a radial position of the beam on the optical disk and determining the boundary or critical linear velocity multiplication factor as a linear velocity multiplication factor in the middle of a variable range of the linear velocity multiplication factor, the correction quantity k can be changed in accordance with linear velocity multiplication factor if the linear velocity multiplication factor is less than the boundary linear velocity multiplication factor, and the correction quantity k can be fixed to a constant value if the linear velocity multiplication factor is not less than the boundary linear velocity multiplication factor.

According to the present invention, there is provided an optical disk recording method for performing recording of data with a variable linear velocity multiplication factor in accordance with a radial position of an irradiation optical beam on an optical disk, the method comprising carrying out a test recording before starting an actual recording at a plurality of test linear velocity multiplication factors lower than a variable range of an actual linear velocity multiplication factor used in the actual recording so as to obtain an appropriate writing power of the irradiation optical beam for each of the test linear velocity multiplication factors, setting a characteristic of an appropriate writing power in function of the radial position of the irradiation optical beam for the actual linear velocity multiplication factor based on the appropriate writing powers obtained for each of the test linear velocity multiplication factors, and carrying out the actual recording such that an appropriate writing power of the irradiation optical beam is calculated based on the set characteristic for the actual linear velocity multiplication factor in accordance with the radial position of the irradiation optical beam. According to the present invention, since the test recording is carried out with each of a plurality of linear velocity multiplication factors lower than a variable range of the linear velocity multiplication factor used in the actual recording, even if the linear velocity multiplication factor used in the actual recording is high, the test recording can be performed with a relatively low number of rotations. Further, self-excited vibration during the test recording can be suppressed, and an appropriate writing power can be stably detected, thereby effecting the actual recording at a high quality level.

According to the present invention, there is provided an optical disk recording method for performing recording of data at a variable linear velocity multiplication factor in accordance with a radial position of an irradiation optical beam on an optical disk, the method comprising carrying out a test recording before starting an actual recording at a first linear velocity multiplication factor within a variable range of an actual linear velocity multiplication factor used in the actual recording and at a second linear velocity multiplication factor below the variable range of the actual linear velocity multiplication factor so as to obtain an appropriate writing power of the irradiation optical beam for each of the first and second linear velocity multiplication factors, setting a characteristic of an appropriate writing power in function of the radial position of the irradiation optical beam for the actual linear velocity multiplication factor based on the appropriate writing powers obtained for each of the first and second linear velocity multiplication factors, and carrying out the actual recording such that an appropriate writing power of the irradiation optical beam is calculated based on the set characteristic for the actual linear velocity multiplication cation factor in accordance with the radial position of the irradiation optical beam. According to the present invention, since the test recording is carried out with one linear velocity multiplication factor within a variable range used in the actual recording and one or a plurality of linear velocity multiplication factors lower than that variable range, the test recording can be performed with a relatively low number of rotations in at least one point. Furthermore, self-excited vibration during the test recording can be suppressed and an appropriate writing power can be stably detected, thereby effecting the actual recording at a high quality level. Moreover, since the test recording is carried out with a linear velocity multiplication factor within a variable range used in the actual recording and a linear velocity multiplication factor lower than that variable range, the test recording can be performed with the linear velocity multiplication factors different from each other, thereby setting a characteristic having less errors of, e.g., an inclination.

It is to be noted that the above-described characteristic of an appropriate writing power can be easily constituted by, for example, one linear function or one quadric or higher-order function. In case of constituting the characteristic by one linear function, a writing power y of an optical beam is variably controlled in accordance with a linear velocity multiplication factor x in conformity with a function y=ax+b. Before starting the actual recording on the optical disk, the test recording is carried out with a linear velocity multiplication factor within a variable range used in the actual recording and two linear velocity multiplication factors lower than that range (or test recording is carried out with two linear velocity multiplication factors lower than a variable range used in actual recording), and an appropriate writing power is calculated with each of both the linear velocity multiplication factors. Then, values of the constants a and b which can be a solution of the function when both the writing powers are the respective linear velocity multiplication factors are calculated and set. In the actual recording, an appropriate writing power value is calculated based on the function in which the values of the constants a and b are set in accordance with the linear velocity multiplication factor at each position in the radial direction, thereby controlling the optical beam to the calculated writing power value.

According to the present invention, there is provided an optical disk recording method for performing recording of data at a variable linear velocity multiplication factor in accordance with a radial position of a irradiation optical beam on an optical disk, the method comprising the steps of performing an actual recording with a variable writing power y=ax+b of the irradiation optical beam in accordance with a linear velocity multiplication factor x where the constant a is determined to a fixed value according to a type of the optical disk, performing a test recording before starting the actual recording such that the test recording is carried out with a test linear velocity multiplication factor to obtain an appropriate writing power of the irradiation optical beam, and setting the constant b by solving the function y=ax+b with using the results of the test recording where y=the appropriate writing power and x=the test linear velocity multiplication factor, whereby the actual recording can be performed with an appropriate writing power y calculated based on the function y=ax+b having the set constants a and b.

According to the present invention, there is provided an optical disk recording method for performing recording of data at a variable linear velocity multiplication factor in accordance with a radial position of a irradiation optical beam on an optical disk, the method comprising the steps of performing an actual recording with a variable writing power y=ax+b of the irradiation optical beam in accordance with a linear velocity multiplication factor x where the constant a is set to a fixed value according to a type of the optical disk, performing a test recording before starting the actual recording such that the test recording is carried out at a plurality of test linear velocity multiplication factors to obtain an appropriate writing power of the irradiation optical beam at each of the test linear velocity multiplication factors, and setting the constant b by solving the function y=ax+b with using the results of the test recording while minimizing a sum of squares of errors of the obtained appropriate writing powers, whereby the actual recording can be performed with an appropriate writing power y calculated based on the function y=ax+b having the set constants a and b. According to experiments conducted by the present inventor, it was found that, when a writing power y of an optical beam can be variably controlled in accordance with a linear velocity multiplication factor x in conformity to a function y=ax+b, a value of the constant a in the function is determined as a fixed value according to a disk type and a value of the constant b can be set based on the test recording with one appropriate linear velocity multiplication factor. According to the present invention, by correctly calculating and setting a value of the constant a in advance, it is possible to reduce measurement errors of the value of the constant a as compared with the case where values of both a an b are calculated in the test recording.

Incidentally, in the present invention, the method for performing recording with a variable linear velocity multiplication factor in accordance with a position on the optical disk in the radial direction includes a case where the linear velocity multiplication factor is sequentially changed in accordance with a position on the optical disk in the radial direction by, for example, applying the constant angular velocity control to the optical disk. In this case, a linear velocity at each time point can be calculated based on, e.g., a number of rotations of the constant angular velocity control and time information read from a wobble of the optical disk, and the constant linear velocity control can be effected on the outer peripheral side on and after attainment of the linear velocity to a predetermined value, thereby performing the recording.

According to the present invention, there is provided an optical disk recording apparatus comprising a disk servo that is provided for driving an optical disk to rotate, an optical pickup that is provided for performing recording and reproducing of data by irradiating the optical disk with an optical beam, an optical power control section that is provided for controlling a power of the optical beam irradiated from the optical pickup, a strategy section that is provided for controlling an irradiation time of a writing optical beam in accordance with a pit length to be formed to (n+k)T, where T is a time corresponding to a unit pit length, n is a multiple number (integer number) of the pit length to be formed relative to the unit pit length, and k is a correction quantity, a storage section that is provided for storing therein a first characteristic that a writing power of the optical beam is increased as a linear velocity multiplication factor of the optical disk is raised, and for storing therein a second characteristic that the correction quantity k varies in accordance with the linear velocity multiplication factor when the same is less than a predetermined critical linear velocity multiplication factor while the correction quantity k is fixed when the linear velocity multiplication factor is not less than the predetermined critical velocity multiplication factor, and a system control section that instructs the writing power of the optical beam to the optical power control section based on the first characteristic of the writing power of the optical beam stored in the storage section in accordance with the linear velocity multiplication factor at the time of recording data on the optical disk, and that instructs the correction quantity k to the strategy section based on the second characteristic of the correction quantity k stored in the storage section. In this case, it can be determined that, for example, the storage section stores therein a characteristic of a correction quantity k relative to the writing linear velocity multiplication factor in accordance with each disk type, and the system control section discriminates a disk type and performs control for instructing the correction quantity k to the strategy section based on a corresponding characteristic among characteristics of correction quantities k stored in the storage section.

According to the present invention, there is provided an optical disk storing apparatus comprising a disk servo that is provided for driving an optical disk to rotate, an optical pickup that is provided for performing recording of data by irradiating an optical beam on the optical beam and reproducing of data in the form of a reproduction signal, an optical power control section that is provided for controlling a power of the optical beam irradiated from the optical pickup, a signal quality level detection section that is provided for calculating a predetermined parameter concerning a quality level of the reproduction signal based on the reproduction signal reproduced by the optical pickup, and a system control section that performs a test recording with a plurality of test linear velocity multiplication factors of the optical less than a variable range of an actual linear velocity multiplication factor used in an actual recording within a predetermined test area of the optical disk before the actual recording, then obtains an appropriate writing optical power for each of the test linear velocity multiplication factors based on the reproduction signal in the test recording, sets a characteristic of an appropriate writing power relative to a linear velocity multiplication factor based on the appropriate writing powers obtained for each of the linear velocity multiplication factors, and calculates an appropriate writing power based on the characteristic in accordance with a linear velocity multiplication factor dependent on a radial position of the writing optical beam, thereby instructing the calculated writing optical power to the optical power control section in the actual recording.

According to the present invention, there is provided an optical disk storing apparatus comprising a disk servo that is provided for driving an optical disk to rotate, an optical pickup that is provided for performing recording of data by irradiating an optical beam on the optical beam and reproducing of data in the form of a reproduction signal, an optical power control section that is provided for controlling a power of the optical beam irradiated from the optical pickup, a signal quality level detection section that is provided for calculating a predetermined parameter concerning a quality level of the reproduction signal based on the reproduction signal reproduced by the optical pickup, and a system control section that performs a test recording at a first test linear velocity multiplication factor of the optical disk within a variable range of an actual linear velocity multiplication factor used in an actual recording before the actual recording and at a second test linear velocity multiplication factor of the optical disk less than the variable range of the actual linear velocity multiplication factor used in the actual recording before the actual recording, then obtains an appropriate writing power for each of the first and second test linear velocity multiplication factors based on the predetermined parameter concerning the quality level of the reproduction signal calculated in the test recording, sets a characteristic of an appropriate writing power relative to a linear velocity multiplication factor based on the appropriate writing powers obtained for each of the first and second linear velocity multiplication factors, and calculates an appropriate writing power based on the set characteristic in accordance with a linear velocity multiplication factor dependent on a radial position of the writing optical beam, thereby instructing the calculated writing power to the optical power control section in the actual recording.

According to the present invention, there is provided an optical disk recording apparatus for performing recording of data at a variable linear velocity multiplication factor in accordance with a radial position of an optical disk, comprising a disk servo that is provided for driving an optical disk to rotate, an optical pickup that is provided for performing recording of data and reproducing of data in the form of a reproduction signal by irradiating the optical disk with an optical beam, an optical power control section that is provided for controlling a power of the optical beam irradiated from the optical pickup, a signal quality level detection section that is provided for calculating a predetermined parameter concerning a quality level of the reproduction signal based on the reproduction signal reproduced by the optical pickup, a storage section that is provided for storing therein a characteristic of a writing power y of the optical beam in the form of a function y=ax+b with respect to a recording linear velocity multiplication factor x, where the constant a has a fixed value according to a disk type, and a system control section that performs a test recording of data with a test linear velocity multiplication factor in a predetermined test area before an actual recording of data on the optical disk, obtaining a writing power for the test linear velocity multiplication factor based on the calculated parameter concerning the quality level of the reproduction signal detected in the test recording, calculates a value of the constant b by solving the function y=ax+b with using the results of the test recording, and calculates an appropriate writing power based on the function y=ax+b in accordance with a linear velocity multiplication factor dependent on the radial position of the optical beam, thereby instructing the calculated writing power to the optical power control section in the actual recording.

According to the present invention, there is provided an optical disk recording apparatus for performing recording of data at a variable linear velocity multiplication factor in accordance with a radial position of an optical disk, comprising a disk servo that is provided for driving an optical disk to rotate, an optical pickup that is provided for performing recording of data and reproducing of data in the form of a reproduction signal by irradiating the optical disk with an optical beam, an optical power control section that is provided for controlling a power of the optical beam irradiated from the optical pickup, a signal quality level detection section that is provided for calculating a predetermined parameter concerning a quality level of the reproduction signal based on the reproduction signal reproduced by the optical pickup, a storage section that is provided for storing therein a characteristic of a writing power y of the optical beam in the form of a function y=ax+b with respect to a linear velocity multiplication factor x, where the constant a has a fixed value according to a disk type, and a system control section that performs a test recording of data with a plurality of test linear velocity multiplication factors in a predetermined test area before an actual recording of data on the optical disk, obtaining a writing power for each of the test linear velocity multiplication factors based on the calculated parameter concerning the quality level of the reproduction signal detected in the test recording, calculates a value of the constant b by solving the function y=ax+b with using the results of the test recording while minimizing a sum of squares of errors of the obtained writing powers, and calculates an appropriate writing power based on the function y=ax+b in accordance with a linear velocity multiplication factor dependent on the radial position of the optical beam, thereby instructing the calculated appropriate writing power to the optical power control section in the actual recording.

According to the present invention, there is provided an optical disk recording apparatus for performing recording of data at a variable linear velocity multiplication factor in accordance with a radial position of an optical disk, comprising a disk servo that is provided for driving an optical disk to rotate, an optical pickup that is provided for performing recording of data and reproducing of data in the form of a reproduction signal by irradiating the optical disk with an optical beam, an optical power control section that is provided for controlling a power of the optical beam irradiated from the optical pickup, a signal quality level detection section that is provided for calculating a predetermined parameter concerning a quality level of the reproduction signal based on the reproduction signal reproduced by the optical pickup, a storage section that is provided for storing therein a characteristic of a writing power y of the optical beam in the form of a function $y=ax2+bx+c$ with respect to a linear velocity multiplication factor x, where the constants a and b has a fixed value according to a disk type, and a system control section that performs a test recording of data with a test linear velocity multiplication factor in a predetermined test area before an actual recording of data on the optical disk, obtaining a writing power for the test linear velocity multiplication factor based on the calculated parameter concerning the quality level of the reproduction signal detected in the test recording, calculates a value of the constant c by solving the function $y=ax2+bx+c$ with using the results of the test recording, and calculates an appropriate writing power based on the function $y=ax2+bx$ +c in accordance with a linear velocity multiplication factor dependent on the radial position of the optical beam, thereby instructing the calculated appropriate writing power to the optical power control section in the actual recording.

According to the present invention, there is provided an optical disk recording apparatus for performing recording of data at a variable linear velocity multiplication factor in accordance with a radial position of an optical disk, comprising a disk servo that is provided for driving an optical disk to rotate, an optical pickup that is provided for performing recording of data and reproducing of data in the form of a reproduction signal by irradiating the optical disk with an optical beam, an optical power control section that is provided for controlling a power of the optical beam irradiated from the optical pickup, a signal quality level detection section that is provided for calculating a predetermined parameter concerning a quality level of the reproduction signal based on the reproduction signal reproduced by the optical pickup, a storage section that is provided for storing therein a characteristic of a writing power y of the optical beam in the form of a function $y=ax2+bx+c$ with respect to a linear velocity multiplication factor x, where the constants a and b has a fixed value according to a disk type, and a system control section that performs a test recording of data with a plurality of test linear velocity multiplication factors in a predetermined test area before an actual recording of data on the optical disk, obtaining a writing power for each of the test linear velocity multiplication factors based on the calculated parameter concerning the quality level of the reproduction signal detected in the test recording, calculates a value of the constant c by solving the function y=ax2+bx+c with using the results of the test recording while minimizing a sum of squares of errors of the obtained writing powers, and calculates an appropriate writing power based on the function y=ax2+bx+c in accordance with a linear velocity multiplication factor dependent on the radial position of the optical beam, thereby instructing the calculated appropriate writing power to the optical power control section in the actual recording.

Incidentally, in the optical disk recording apparatus according to the present invention, for example, the storage section can store therein a characteristic of a writing power y of an optical beam relative to the writing linear velocity multiplication factor in accordance with each disk type, and the system control section can discriminate a disk type and execute control for instructing the writing power y of the optical beam based on a corresponding characteristic among characteristics of the writing powers y of the optical beams stored in the storage section. Further, for example, the system control section can issue a command for driving the disk servo at a constant angular velocity on the inner peripheral side with an appropriate position on the optical disk in the radial direction as a boundary and driving the same at a constant linear velocity on the outer peripheral side with a linear velocity multiplication factor final value in the constant angular velocity control. Furthermore, the optical disk recording apparatus according to the present invention further comprises a time information reading section for reading time information from a wobble of the optical disk so that a linear velocity at each time point can be calculated based on a number of rotations of the constant angular velocity control and the time information read from the wobble of the optical disk, and constant linear velocity control can be performed on the outer peripheral side on and after the attainment of the linear velocity to a predetermined value, thereby effecting the recording.

Moreover, in the present invention, the test recording can be carried out in a PCA (Power Calibration Area) on the disk innermost periphery, for example. In addition, the present invention can be applied to the recording on a pigment-based write-once-read-many optical disk such as a CD-R disk, DVD-R disk and others as well as various kinds of optical disks to which the present invention can be applied.

DETAILED DESCRIPTION OF THE INVENTION

Figure 3:
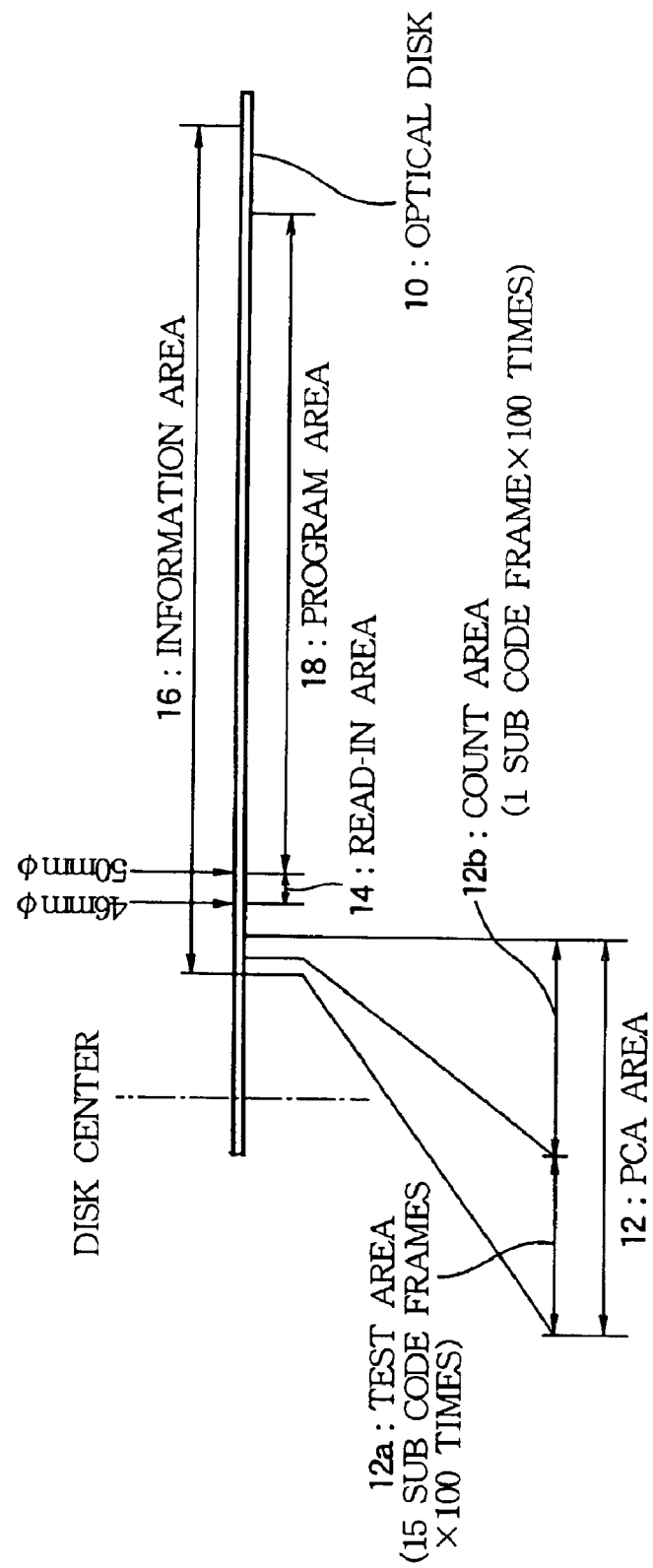
FIG. 3 is a cross-sectional view showing area division of a CD-R disk in the radial direction.

The mode for carrying out the present invention will now be described. Here, description will be given as to the case where the present invention is applied to a CD-R disk when recording is effected by switching CAV recording and CLV recording in accordance with a position on the CD-R disk in the radial direction. FIG. 3 shows area division of the CD-R disk. In an optical disk 10 (CD-R disk), a section having a diameter of 46 to 50 mm is prepared as a read-in area 14, and a PCA (Power Calibration Area) 12 is prepared on the inner peripheral side. The PCA area 12 is constituted by a test area 12a and a count area 12b. In the test area 12a, test recording of OPC (Optimum Power Control: adjustment of an optimum writing power of a recording beam) is performed. As to this test recording, for example, test recording for one time is carried out by changing the writing power in 15 stages, EFM signals for one sub code frame (the present invention is not restricted thereto) are recorded per one writing power, and EFM signals for a total of 15 sub code frames are recorded. In the test area 12a, a capacity (for example, 1500 sub code frames) for carrying out the test recording for 100 times (corresponding to 100 times of OPC because test recording is carried out for one time with OPC for one time) is allocated. In the count area 12b, EFM signals for one sub code frame is recorded every time OPC is effected. In the count area 12b, a capacity corresponding to the same number of times of OPC as that in the test area 12a is allocated (for example, if 100 times of OPC, 100 sub code frames). When performing OPC, how far the EFM signals have been recorded in the count area 12b is detected in advance, and an appropriate position in the test area 12a at which this test should be started is judged.

A program area 18 is prepared on the outer peripheral side in contiguity with the read-in area 14. Time information and others are recorded as ATIP information on wobbles of the entire tracks (pre-grooves) in an information area 16. As to the ATIP time information, continuous (simply increasing) values are recorded from a start position of the program area 18 as a base point to the end of the outer peripheral side of the information area 16 on the outer peripheral side, and continuous (simply decreasing) values are recorded from the base point to the end of the inner peripheral side of the information area 16 on the inner peripheral side. A read-out area is formed immediately after an end portion (position at which recording is closed) of the program area 18.

Figure 1:
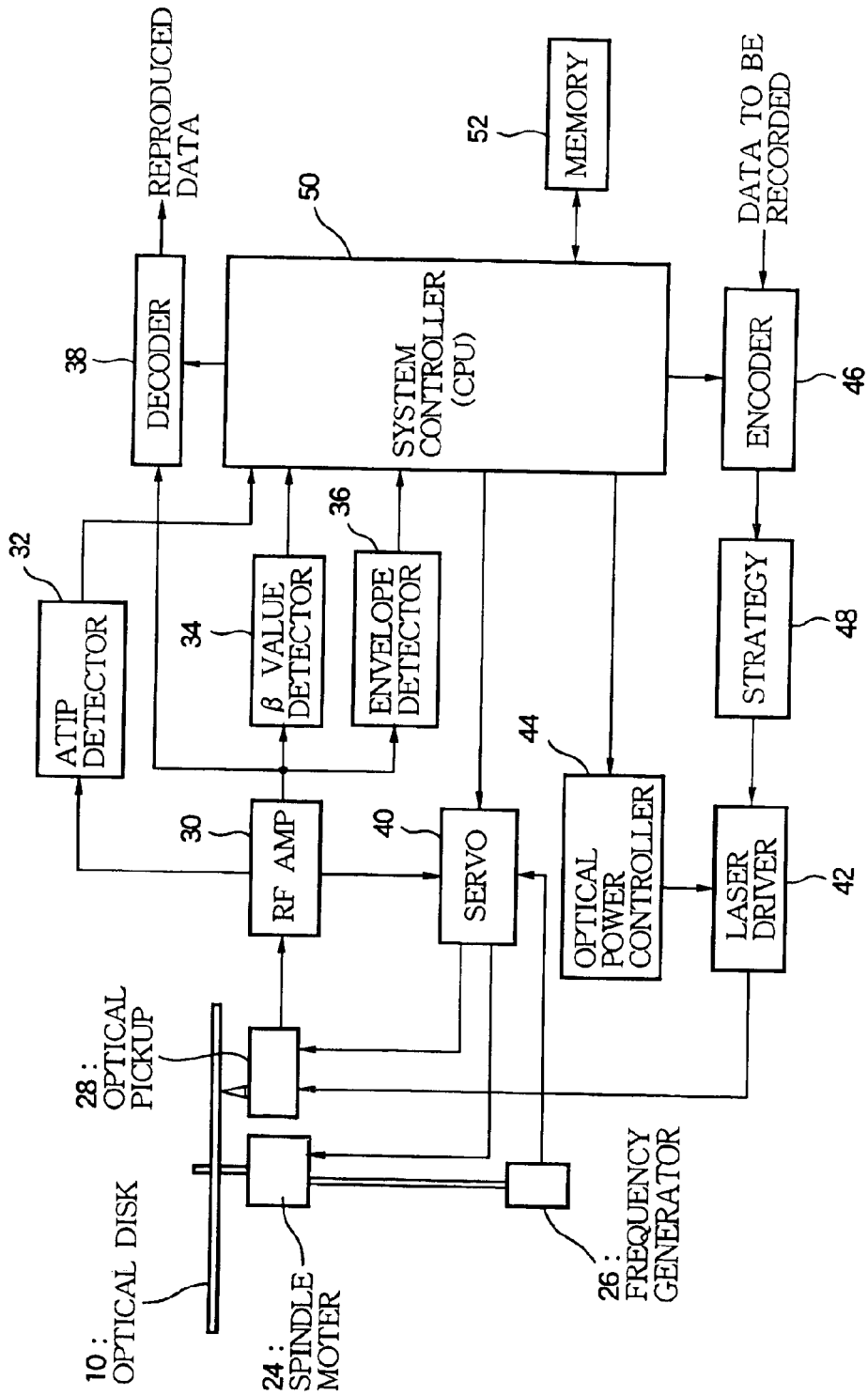
FIG. 1 is a block diagram showing an embodiment of an optical disk recording apparatus according to the present invention.
Figure 2:
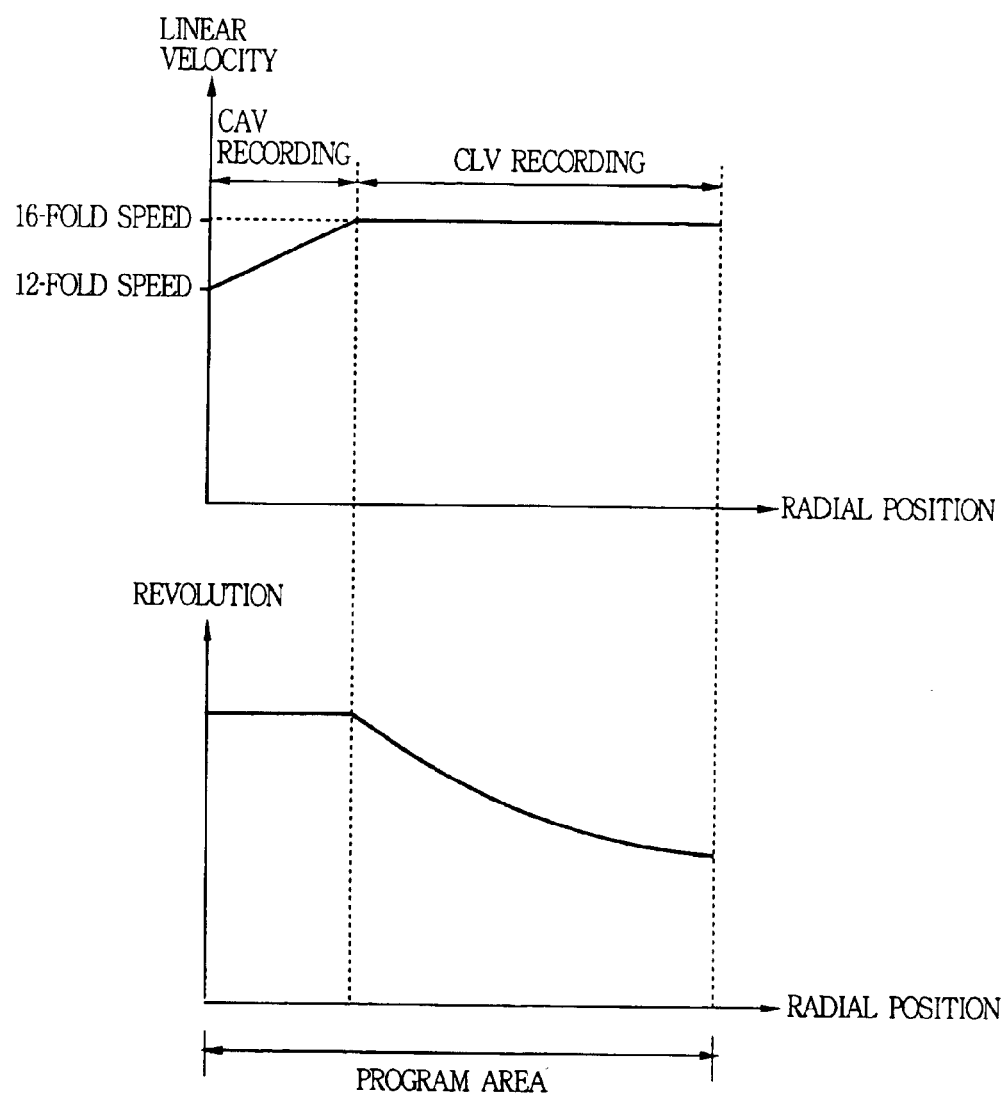
FIG. 2 is an explanatory drawing of a method for performing data recording on CD-R by CAV on the inner peripheral side and CLV on the outer peripheral side.

FIG. 1 shows an embodiment of the optical disk recording apparatus according to the present invention. The optical disk 10 (CD-R disk) is driven to rotate by a spindle motor 24. A frequency generator 26 detects a number of rotations of the spindle motor 24. An optical pickup 28 irradiates the optical disk 10 with an optical beam (laser beam) to perform recording/reproduction of information. A return beam acceptance signal (EFM signal) of the optical pickup 28 is supplied to an RF amplifier 30. An ATIP detection circuit 32 extracts a wobble signal component from the EFM signal, and decodes ATIP information included in this wobble signal component. The ATIP information includes time information of each position (address information) or identification information indicative of a disk type (disk ID). A β value detection circuit 34 calculates a value β (asymmetry value) from an EFM signal waveform as a parameter concerning a reproduction signal quality level. Assuming that a peak level of the reproduction EFM signal waveform (sign is +) is a and a bottom level of the same is b (sign is −), the value β can be obtained by (a+b)/(a−b). An envelope detection circuit 36 detects an envelope of the EFM signal. This envelope detection is used for detecting how far the EFM signals have been recorded in the count area 12b (FIG. 3) in advance when executing OPC. A decoder 38 EFM-demodulates the EFM signal to obtain reproduction data.

A servo circuit 40 executes rotation control of the spindle motor 24 and each control such as focusing, tracking and feeding of the optical pickup 28. The spindle motor 24 is controlled by switching CAV control and CLV control in accordance with a position in the radial direction. CAV control is effected by controlling the spindle motor 24 in such a manner that a number of rotations detected by the frequency generator 26 coincides with a set number of rotations. CLV control is performed by controlling the spindle motor 24 in such a manner that the wobble signal detected from the EFM signal has a set linear velocity multiplication factor. A laser driver 42 drives a laser source in the optical pickup 28. An optical power control circuit 44 controls the laser driver 42 to adjust the laser power at the time of recording (test recording and actual recording) and reproduction. Recording data is EFM-modulated by an encoder 46 and a time axis is corrected by a strategy circuit 48 to modulate a laser drive signal of the laser driver 42. When the laser source in the optical pickup 28 is driven by the modulated laser drive signal, information is recorded. In reproduction, the laser driver 42 drives the laser source in the optical pickup 28 with a predetermined reproduction power.

A memory 52 is constituted by a flash ROM and the like and stores therein a characteristic of a correction value k of a recording strategy relative to a writing linear velocity multiplication factor and a characteristic of a writing power relative to the writing linear velocity multiplication factor. Information of these characteristics can be updated by downloading.

A system control circuit 50 (CPU) controls the entire optical disk recording apparatus. The system control circuit 50 executes the following types of control in regard to the present invention in particular.

(a) A disk type is discriminated based on a disk ID detected by the ATIP detection circuit 32, and a corresponding characteristic is designated from the characteristic of the correction quantity k of the recording strategy and the characteristic of the writing power of the optical beam stored in the memory 52.

(b) Before starting actual recording on the optical disk 10, test recording is carried out in the PCA area 12; a writing power value that the value β detected by the β value detection circuit 34 becomes an appropriate value is obtained based on a reproduction signal of the test recording; and an undetermined constant in a characteristic function of the writing power of the optical beam is set based on this measurement.

(c) In actual recording, a linear velocity multiplication factor at each time point is calculated based on a directed number of rotations for the constant angular velocity control (upper limit value of a number of rotations preset in the drive and the like) and the time information detected by the ATIP detection circuit 32. Further, on the inner peripheral side before the linear velocity multiplication factor reaches a directed linear velocity multiplication factor (linear velocity multiplication factor directed by a user and the like), the system control circuit 50 directs the servo circuit 40 the constant angular velocity drive with the directed number of rotations. Furthermore, on the outer peripheral side after the linear velocity multiplication factor reaches the directed linear velocity multiplication factor, the system control circuit 50 directs the constant linear velocity drive with the directed linear velocity multiplication factor. In this case, the linear velocity multiplication factor V at each time point can be calculated by, for example, the following expression.

$$V = 2\pi R \cdot V_{CAV}/V_{CLV}$$

where R: a radius value of a corresponding position $V_{CAV}$: a directed number of rotations for the constant angular velocity control $V_{CLV}$: a linear velocity inherent to a disk It is to be noted that the radius value R of the corresponding position in the above expression can be obtained by, e.g., the arithmetic operation of the following expression.

$$R = \{(T \cdot P \cdot V_{CLV}/\pi) + R_o^2\}^{1/2}$$

where T: ATIP time information of the corresponding position

T: a track pitch inherent to a disk $R_o$: a radius of an innermost periphery of the program area For example, assuming that a disk having P=1.6 μm and $V_{CLV}$=1.2 m/second is used to perform CAV drive with $V_{CAV}$=6000 rpm, the radius value R of the position of a frame having T=5:00:00 can be expressed as follows:

$$R = \{[(5 \cdot 60) \cdot (1.6 \cdot 10^{-3}) \cdot (1.2 \cdot 10^3)/\pi] + 25^2\}^{1/2} = 28.43 \text{ mm}$$

Therefore, the linear velocity multiplication factor V at that position can be obtained as follows:

$$V = 2\pi \cdot 28.43 \cdot (6000/60)/(1.2 \cdot 10^3) = 14.88\text{-fold speed}$$

It is to be noted that values of the linear velocity $V_{CLV}$ inherent to a disk and the track pitch P inherent to a disk can be acquired by measuring these values after inserting the optical disk 10 into the optical disk recording apparatus and before starting actual recording or storing these values for each disk type in the memory 52.

(d) In actual recording, in accordance with the writing linear velocity multiplication factor, a writing power of an optical beam is directed to the optical power control circuit 44 based on the characteristic of the writing power of the optical beam, and a correction quantity k is directed to the strategy circuit 48 based on the characteristic of the correction quantity k of the recording strategy.

Incidentally, if the optical disk 10 is of a disk type which is not stored in the memory 52, the system control circuit 50 executes test recording with at least two linear velocity multiplication factors and sets the entire characteristic of the writing power of the optical beam relative to the writing linear velocity multiplication factor. In addition, as to the correction quantity k of the recording strategy at this time, for example, a standard characteristic is stored in the memory 52 and used.

Description will now be given as to adjustment of the correction quantity of the irradiation time of the writing optical beam by the optical disk recording apparatus shown in FIG. 1. In accordance with a pit length to be formed, the strategy circuit 48 controls the irradiation time of the writing optical beam to (n+k)T, where T: a time corresponding to a unit pit length n: a multiple number (integer number from 3 to 11) of a pit length to be formed relative to the unit pit length k: a correction quantity.

Figure 4:
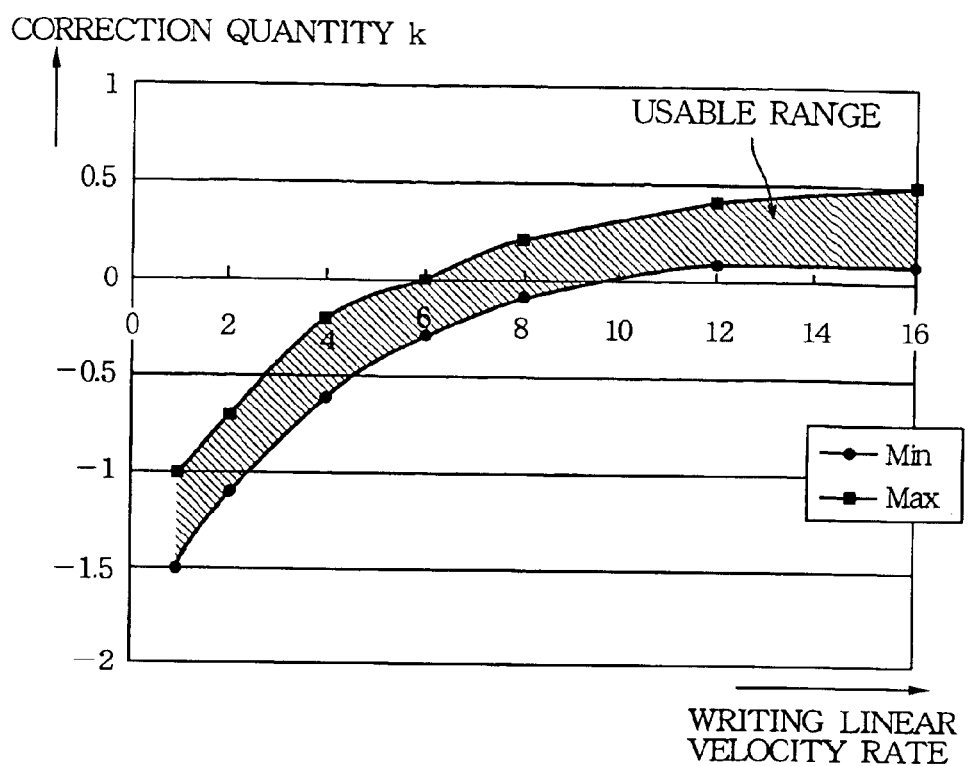
FIG. 4 is a characteristic view showing an example of an appropriate range of a correction quantity k relative to a writing velocity multiplication factor of the CD-R disk.
Figure 5:
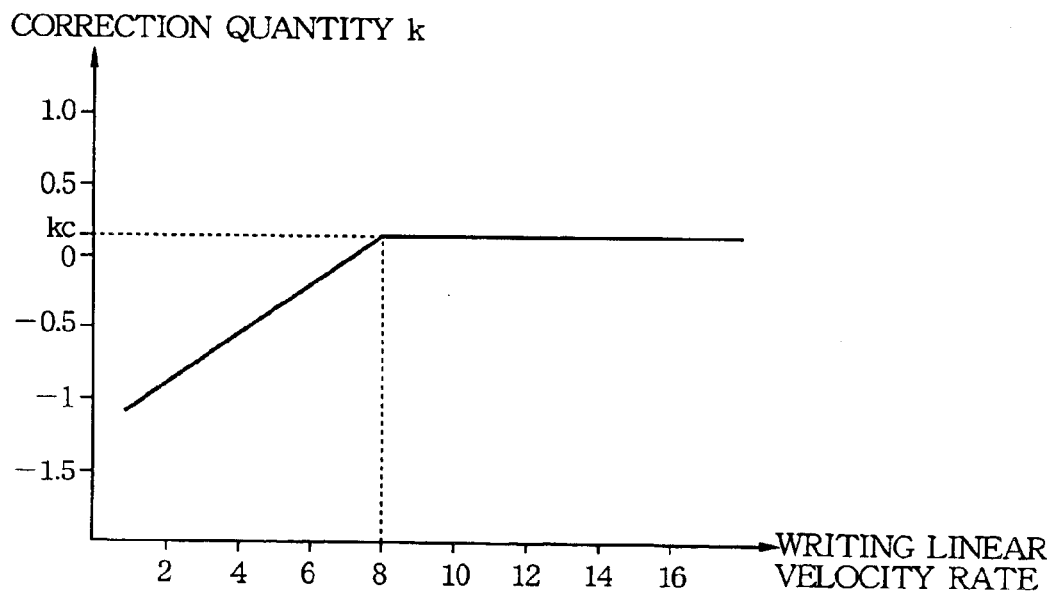
FIG. 5 is a view showing a characteristic example of the correction quantity k by a strategy circuit in FIG. 1 when using an optical disk having the characteristic illustrated in FIG. 4.

FIG. 4 shows a range of the correction quantity k (hatched area) in which characteristics such as an C1 error or jitter of the reproduction signal become excellent when recording while changing the writing linear velocity multiplication factor with the power (writing power) of the writing optical beam being appropriately maintained. From this drawing, it can be understood that, when the eight-multiplication factor is determined as a boundary, the range of an appropriate value k relative to the writing linear velocity multiplication factor largely fluctuates with the writing linear velocity multiplication factor not more than that boundary but the range of an appropriate value k rarely changes with the writing linear velocity multiplication factor not less than that boundary even if the writing linear velocity multiplication factor changes. FIG. 5 shows an example of the characteristic of the correction quantity k by the strategy circuit 48 when the optical disk having the characteristic shown in FIG. 4 is used. According to the characteristic shown in FIG. 5, with the eightfold speed being determined as a boundary linear velocity multiplication factor, the correction quantity k is linearly (or curvilinearly) changed in accordance with the writing linear velocity multiplication factor in case of less than the eightfold speed and the correction quantity k is set as a fixed value kc in case of not less than the eightfold speed. It is to be noted that the characteristic of the correction quantity k for each disk type is previously stored in the memory 52 and a corresponding characteristic is read and used in accordance with a detected disk ID.

Figure 6:
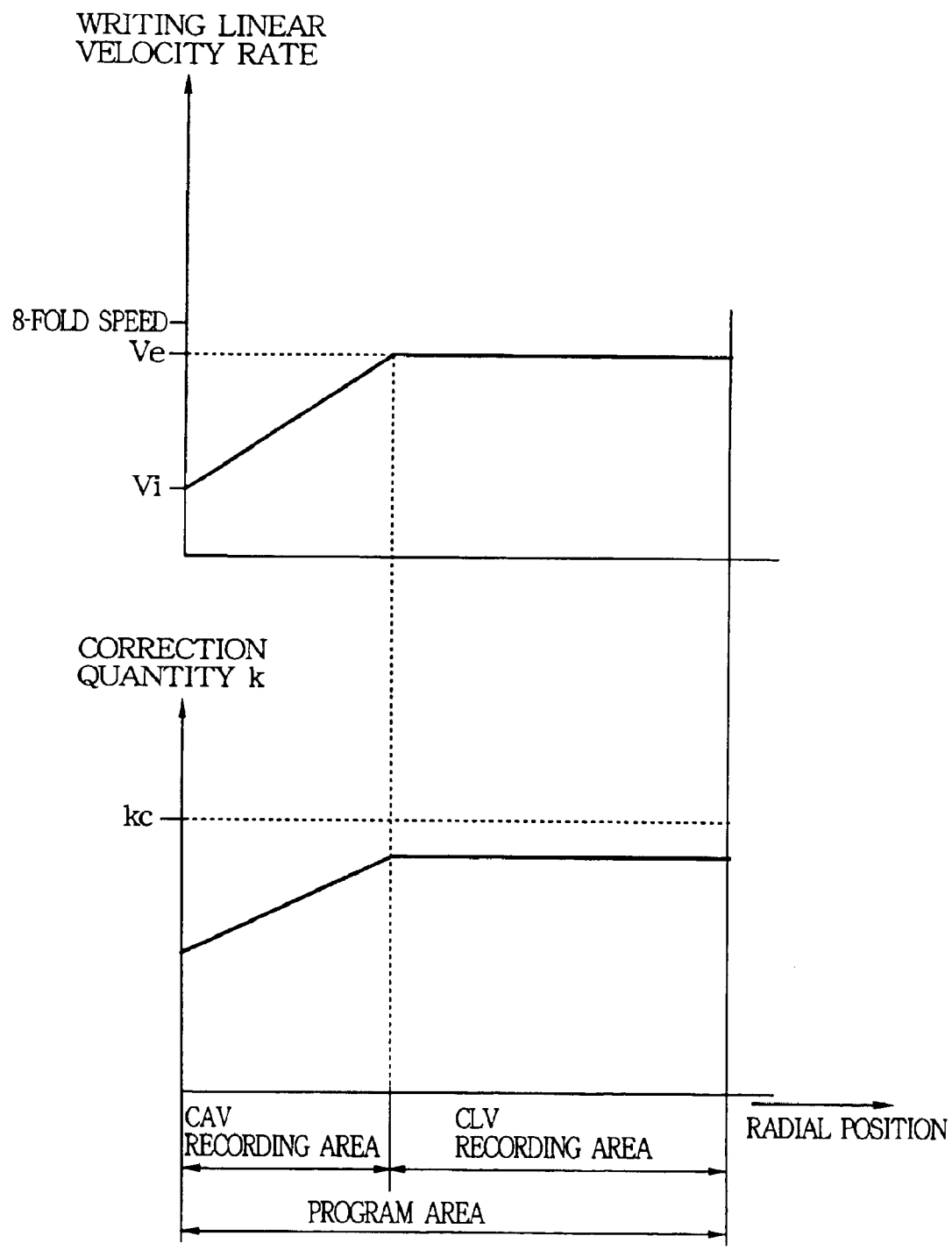
FIG. 6 is a view showing an example of a characteristic of changes in the linear velocity multiplication factor and the correction quantity k relative to a position on the disk in the radial direction when using the characteristic of the correction quantity k in FIG. 5 and performing the recording by switching CAV recording and CLV recording.
Figure 7:
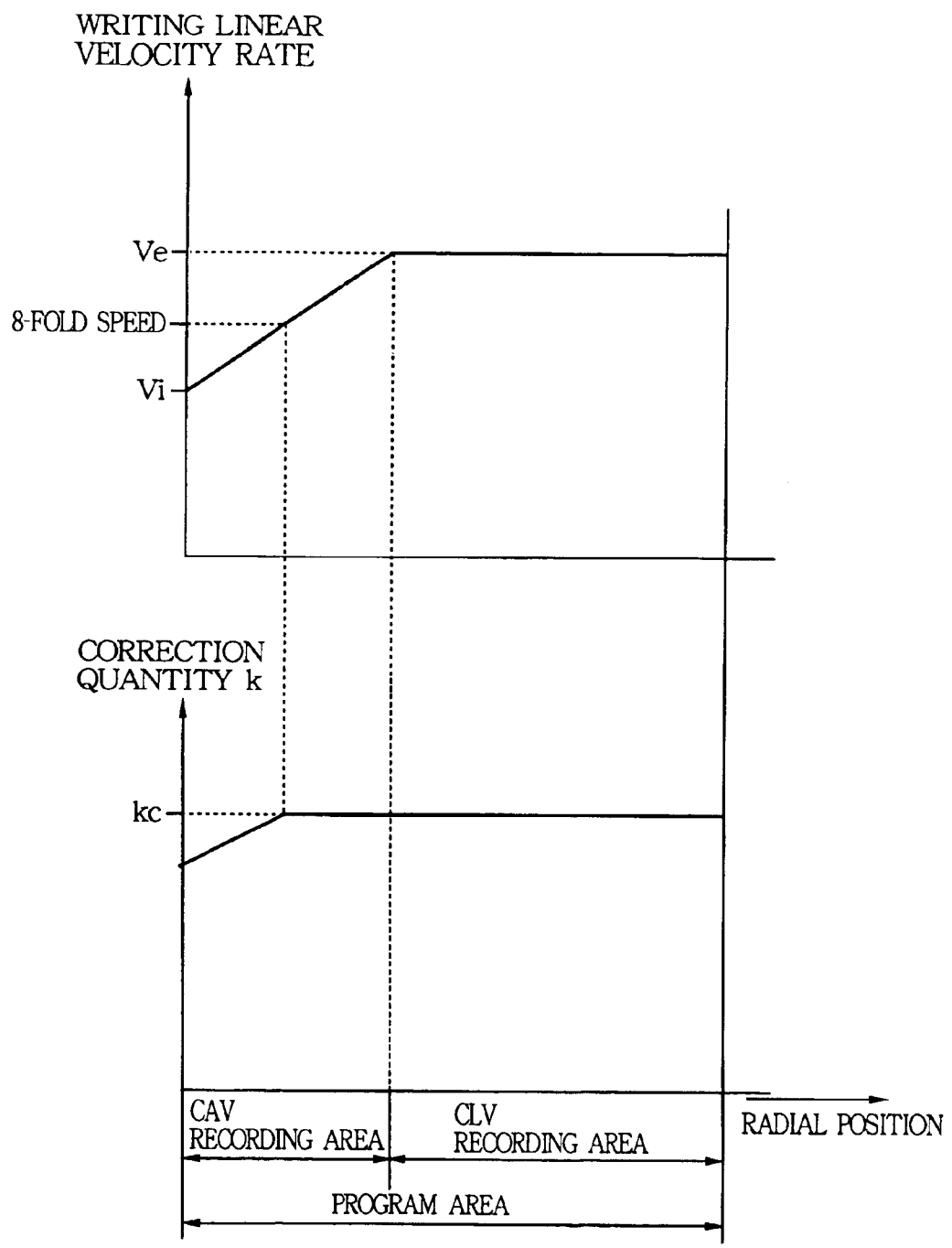
FIG. 7 is a view showing another example of a characteristic of changes in the linear velocity multiplication factor and the correction quantity k relative to a position on the disk in the radial direction when using the characteristic of the correction quantity k in FIG. 5 and performing recording by switching CAV recording and CLV recording.
Figure 8:
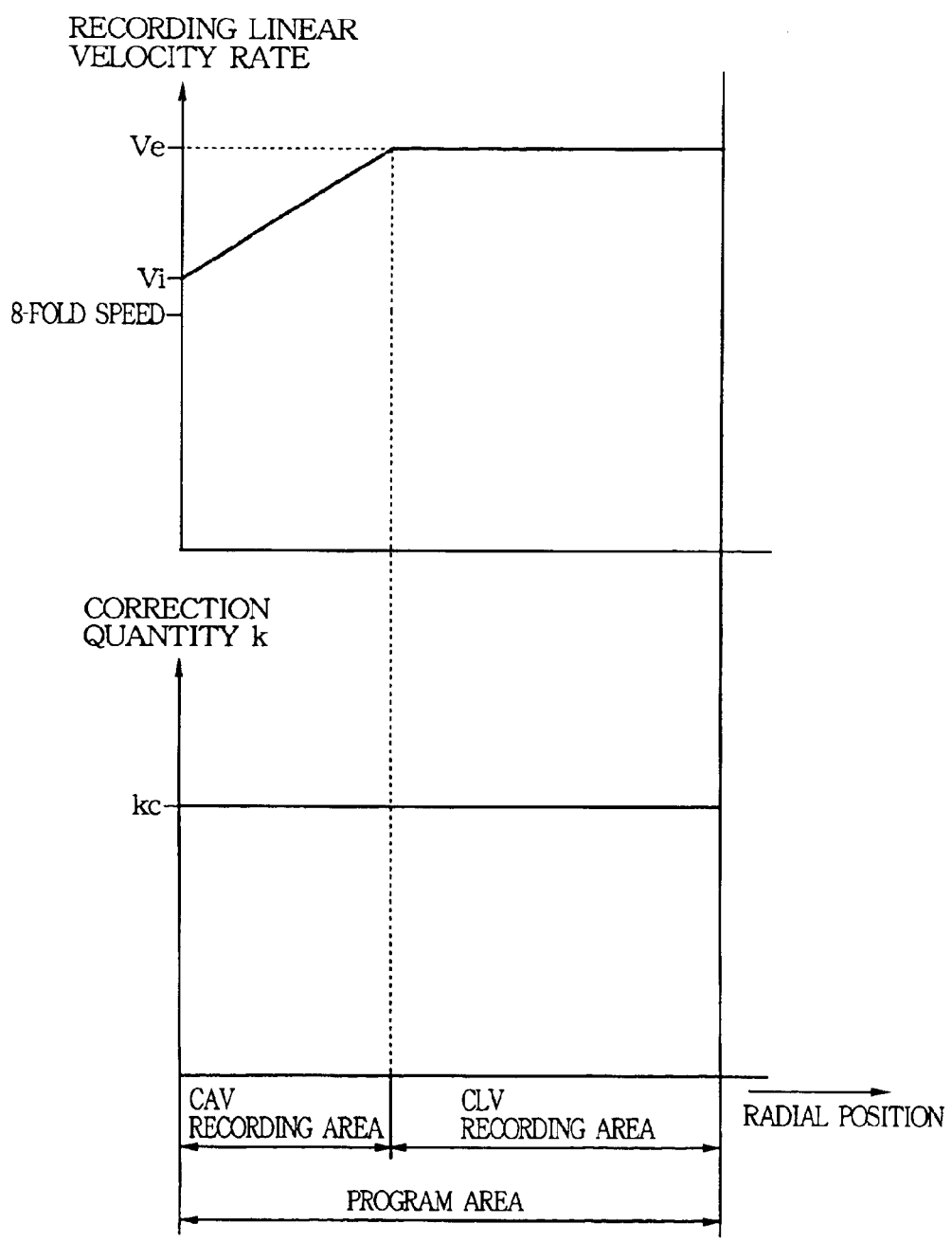
FIG. 8 is a view showing still another example of a characteristic of changes in the linear velocity multiplication factor and the correction quantity k relative to a position on the disk in the radial direction when using the characteristic of the correction quantity k in FIG. 5 and performing the data recording by switching CAV recording and CLV recording.

FIGS. 6 to 8 show changes in the linear velocity multiplication factor and the correction quantity k relative to a position on the disk in the radial direction when using the characteristic of the correction quantity k shown in FIG. 5 and effecting recording by switching CAV recording and CLV recording. FIG. 6 shows a case where the linear velocity multiplication factor for CAV recording is always not more than the eightfold speed (Vi indicates an initial value of the linear velocity multiplication factor for CAV recording and Ve indicates a final value of the same linear velocity multiplication factor), and the correction quantity k change across the CAV recording area at this time. FIG. 7 shows a case where the linear velocity multiplication factor for CAV recording changes with the eightfold speed in the center, and the correction quantity k in this case is fixed to a constant value kc after the linear velocity multiplication factor reaches the eightfold speed. FIG. 8 shows a case where the linear velocity multiplication factor for CAV recording is always not less than the eightfold speed, and the correction quantity kc is fixed to a constant value kc across the program area.

Description will now be given on the power control of the writing optical beam by the optical disk recording apparatus shown in FIG. 1. Here, the writing linear velocity multiplication factor is changed as shown in FIG. 9(a) to effect recording. That is, the linear velocity multiplication factor for CLV recording is set to Ve (linear velocity multiplication factor directed by a user and the like), and CAV recording is carried out with the directed number of rotations in an area on the inner peripheral side in the program area 18 where a number of rotations becomes the directed value (upper limit value of a number of rotations preset in the drive and the like) with the liner velocity multiplication factor Ve. The initial value of the linear velocity multiplication factor for CAV recording is Vi and the final value of the linear velocity multiplication factor for the same is Ve. FIG. 9(b) shows changes in the writing power of the optical beam at this time. In the CAV recording area, the writing power increases as the linear velocity multiplication factor is raised (the writing power in the linear velocity multiplication factor initial value Vi is Pi and the writing power in the linear velocity multiplication factor final value Ve is Pe), and the writing power becomes Pe and constant after reaching the CLV recording area.

Figure 9:
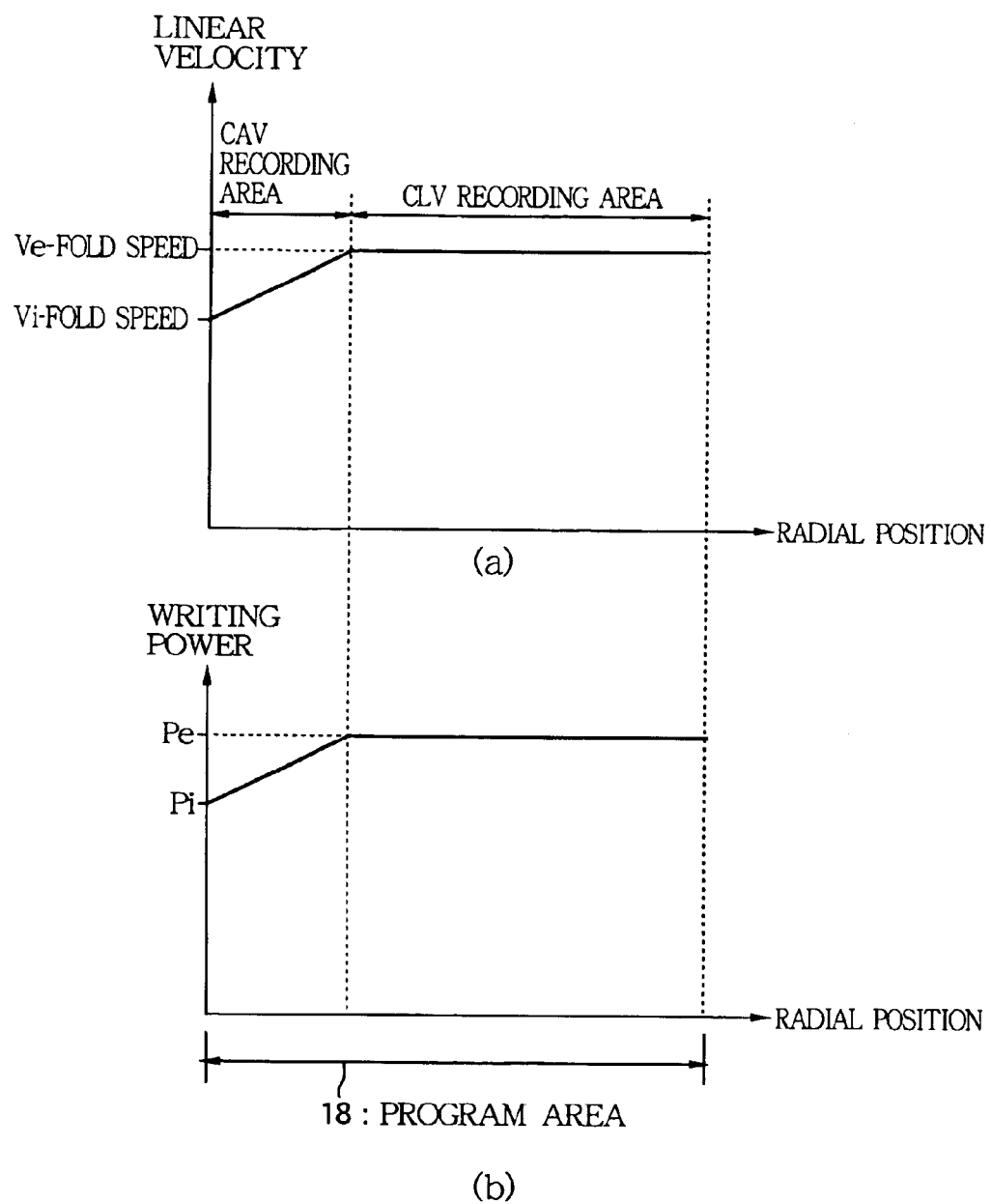
FIGS. 9 are views showing examples of a characteristic of changes in a writing linear velocity multiplication factor and a writing power relative to a position on an optical disk in the radial direction.

Description will now be given as to a concrete example of how to obtain the writing power characteristic relative to the recording liner velocity multiplication factor in case of controlling the writing linear velocity multiplication factor and the writing power to perform recording as shown in FIG. 9.

EXAMPLE 1

When Using a Super Cyanine Type CD-R Disk Manufactured by A (Which Will be Referred to as a "Disk A" hereinafter)

Figure 10:
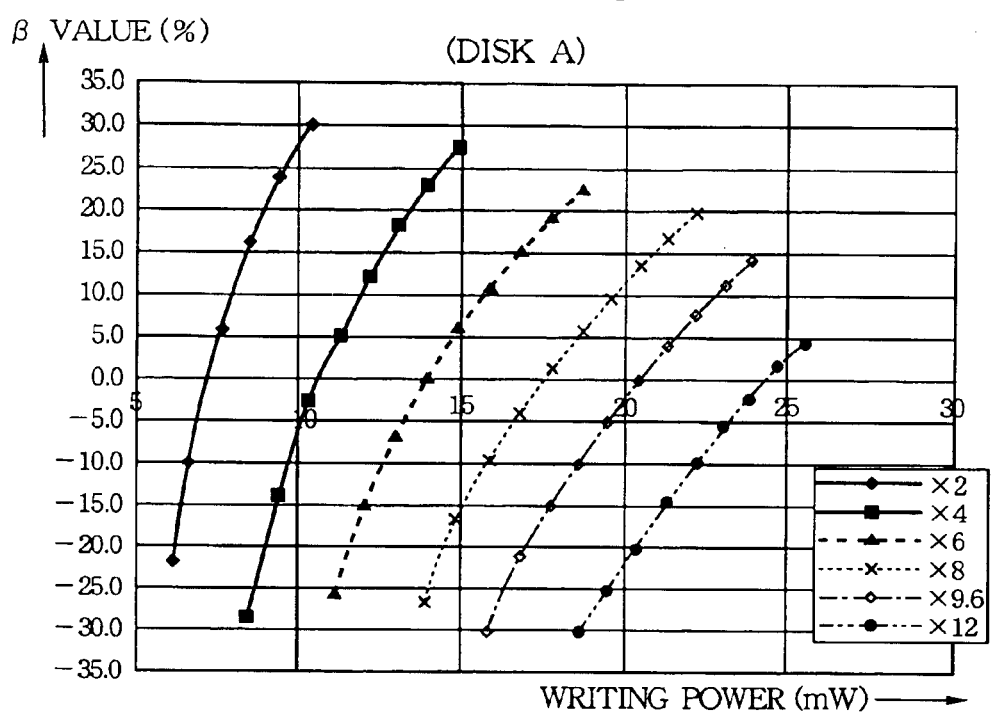
FIG. 10 is a view showing a characteristic of a value β of a reproduction RF signal relative to a writing power when performing recording by using a disk A while changing the writing power in various linear velocity multiplication factors in many ways.
Figure 11:
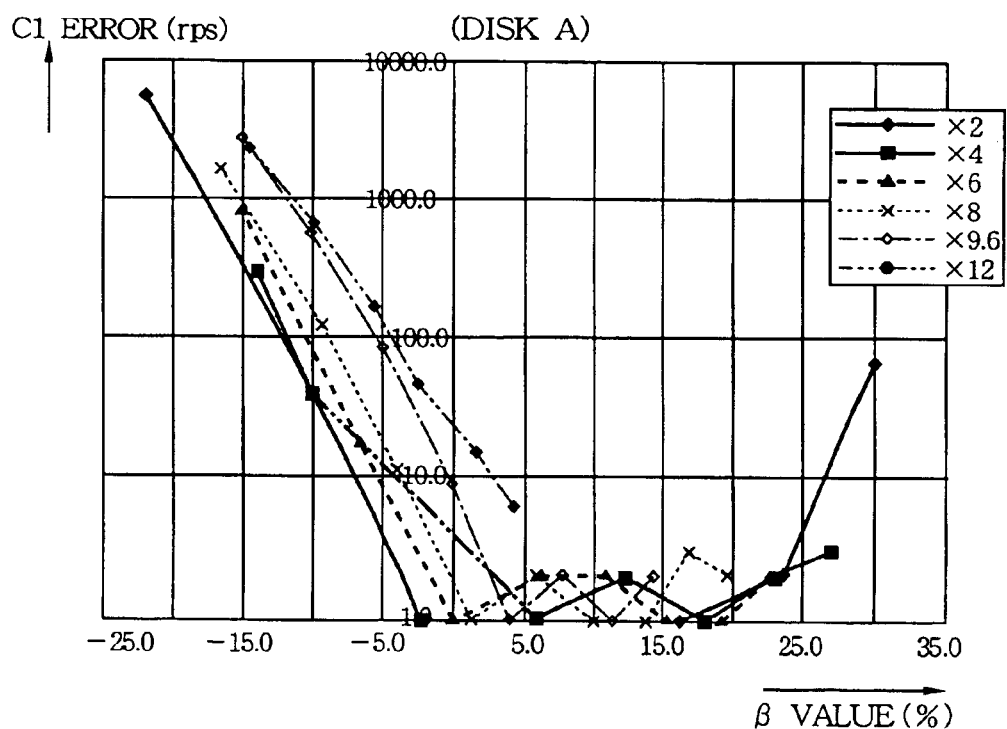
FIG. 11 is a view showing a characteristic of an C1 error relative to the value β when EFM-demodulating the reproduction RF signal caused due to recording illustrated in FIG. 10.
Figure 12:
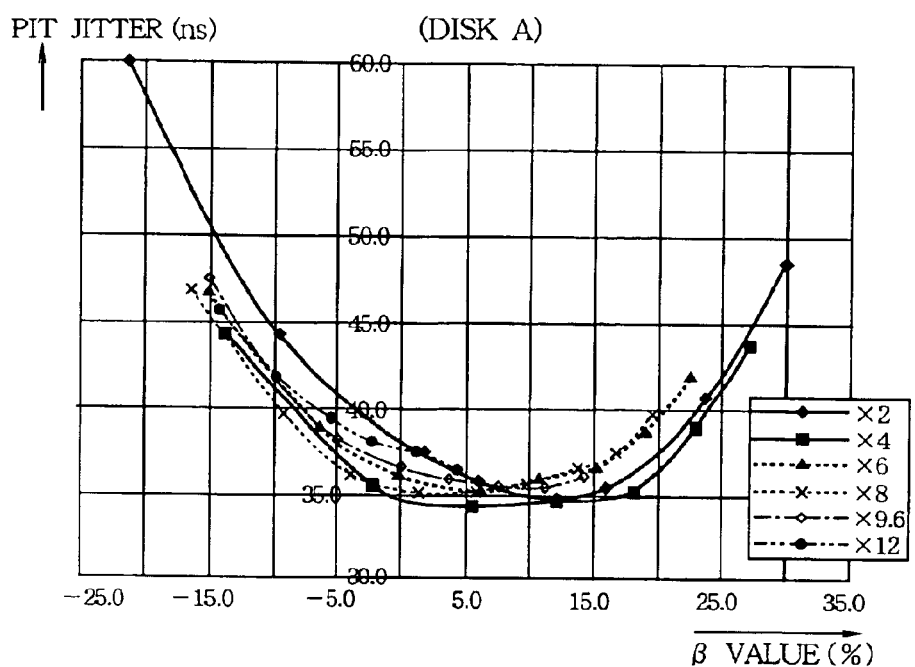
FIG. 12 is a view showing a characteristic of pit jitter relative to the value β of the reproduction RF signal caused due to recording illustrated in FIG. 10.
Figure 13:
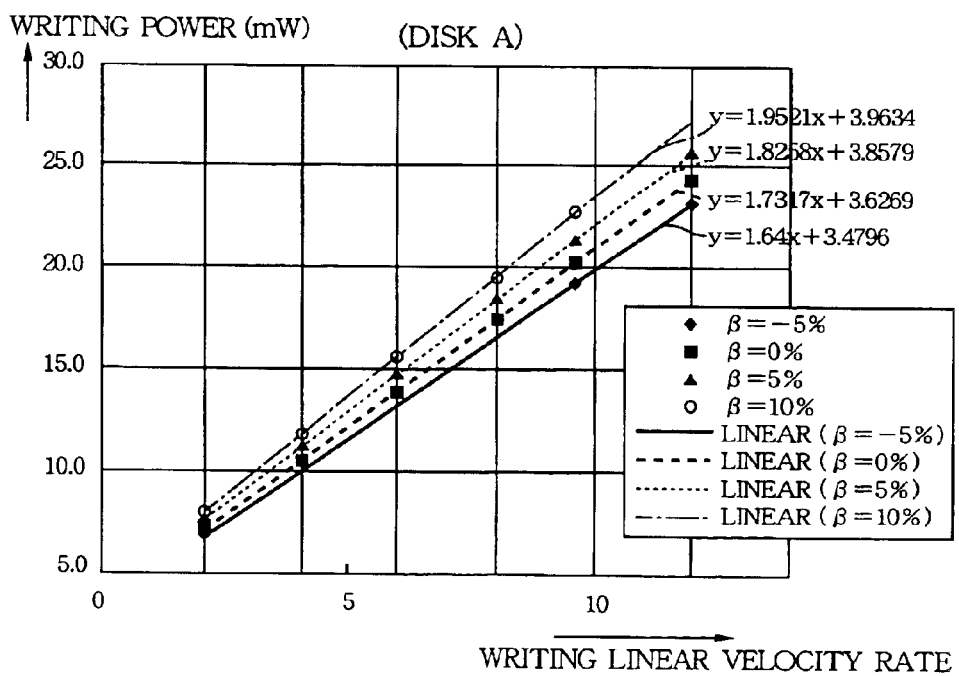
FIG. 13 is a characteristic view showing a writing power relative to a writing linear velocity multiplication factor for each value β obtained by developing the characteristic in FIG. 10.

FIG. 10 shows a characteristic of a value β of a reproduction RF signal relative to the writing power when performing recording while changing the writing power in various linear velocity multiplication factors by using the disk A in many ways. FIG. 11 shows a characteristic of a C1 error relative to the value β when EFM-demodulating the reproduction RF signal. FIG. 12 shows a characteristic of the pit jitter relative to the value β of the reproduction RF signal. FIG. 13 is shows a characteristic of the writing power relative to the writing linear velocity multiplication factor for each value β calculated by developing the characteristic illustrated in FIG. 10. According to FIG. 13, the characteristic of the writing power relative to the linear velocity multiplication factor when maintaining the value β to a predetermined value and effecting recording can be approximated by the following linear function:

$$y=ax+b$$

where y: a writing power, and
x: a linear velocity multiplication factor Further, according to FIGS. 11 and 12, in case of the disk A, since the power margin is sufficiently wide (range of the value β is wide when the C1 error and the pit jitter are low) even in high-speed recording, a target value (target β) of the value β can be set to a fixed value irrespective of the writing linear velocity multiplication factor. Therefore, when the target value of the value β is set 5% constant for example, it can be understood from FIG. 13 that values of a (inclination) and b (y segment) in the writing power characteristic function y=ax+b relative to the writing linear velocity multiplication factor can be set to a=1.8258 and b=3.8579.

Figure 14:
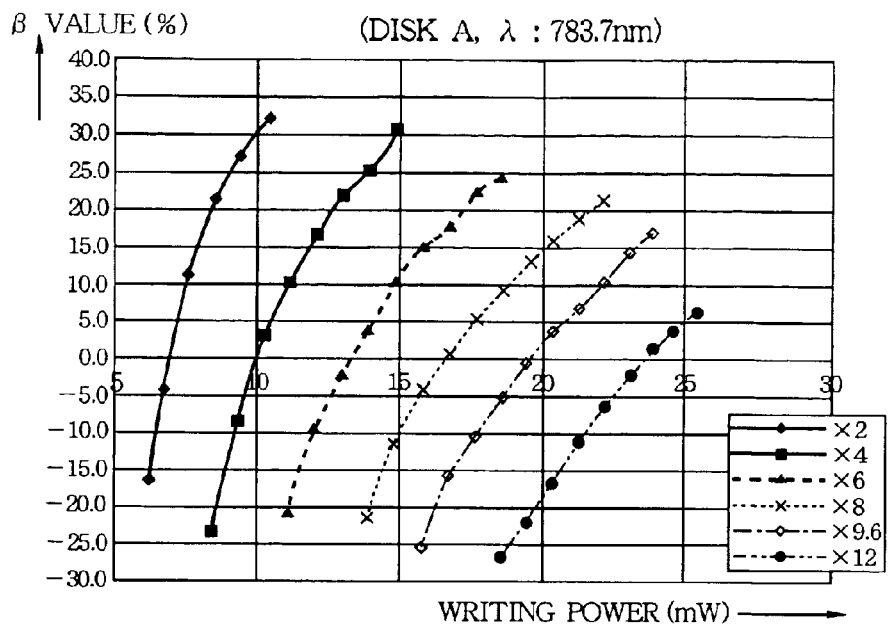
FIG. 14 is a view showing a characteristic of the value β of the reproduction RF signal relative to the writing power when performing recording on the disk A while changing the writing power with various linear velocity multiplication factors in many ways by using a drive having different wavelengths of optical beams.
Figure 15:
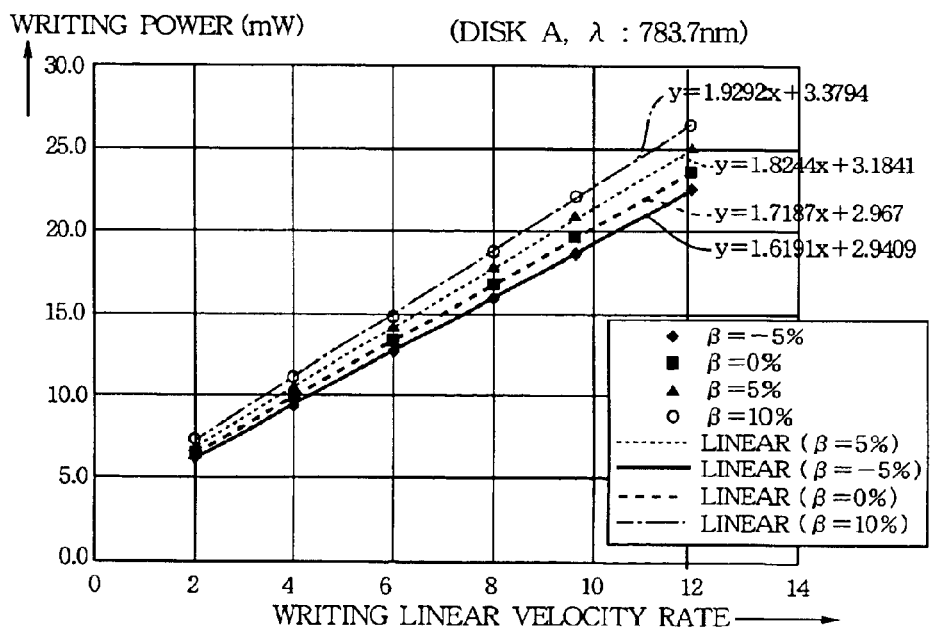
FIG. 15 is a characteristic view of a writing power relative to a writing linear velocity multiplication factor for each value β obtained by developing the characteristic shown in FIG. 14.

Although FIG. 10 shows the characteristic when a wavelength of an optical beam is 787 nm, the wavelengths of the optical beams somewhat differ from each other depending on each drive, and the influence by a difference in wavelength must be examined. FIG. 14 shows a characteristic of the value β of the reproduction RF signal relative to the writing power when information is recorded on the disk A by using a drive having the wavelength of the optical beam being 783.7 nm while changing the writing power with various linear velocity multiplication factors in many ways. FIG. 15 shows a characteristic of the writing power relative to the writing linear velocity multiplication factor for each value β calculated by developing the characteristic illustrated in FIG. 14. According to FIG. 15, values of a and b in the function y=ax+b are a=1.8244 and b=3.1841 when the value β is 5%. When these values are compared with the values of a and b when the value β is 5%, values of a are substantially equal to each other and values of b are relatively largely different from each other. Therefore, it can be understood from this result that the value a should be fixed and only the value b needs to be changed even if the wavelength of the optical beam slightly changes. Thus, as the characteristic function of the writing power relative to the writing linear velocity multiplication factor concerning the disk A, y=ax+b (a is fixed and b is undetermined) is previously stored in the memory 52, and test recording (OPC) is carried out before actual recording in order to set the value b.

Figure 16:
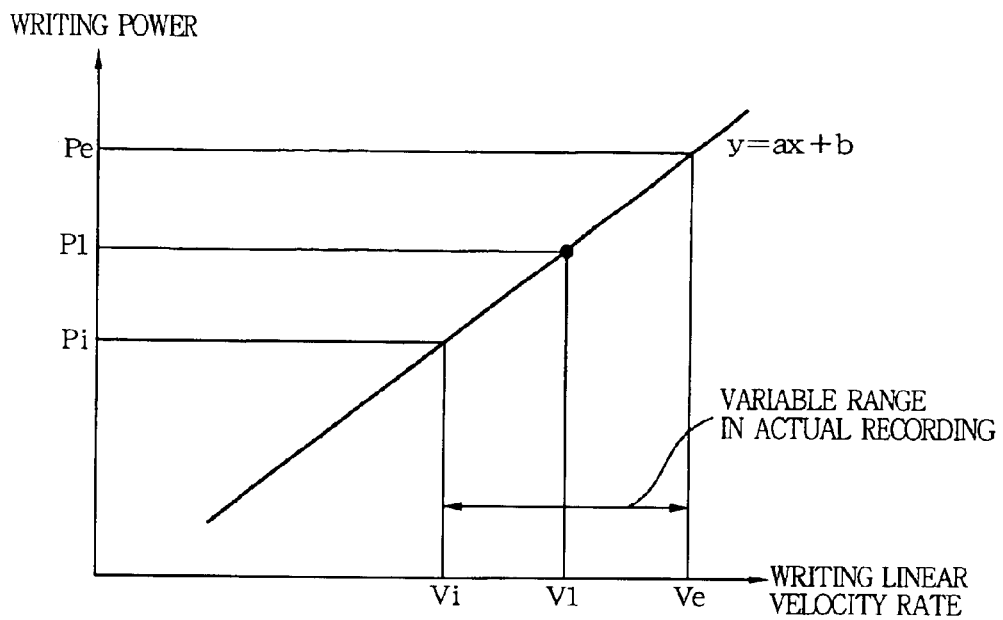
FIG. 16 is a view showing an example of a technique for obtaining a value b in a writing power characteristic y=ax+b in test recording with respect to the disk A.
Figure 17:
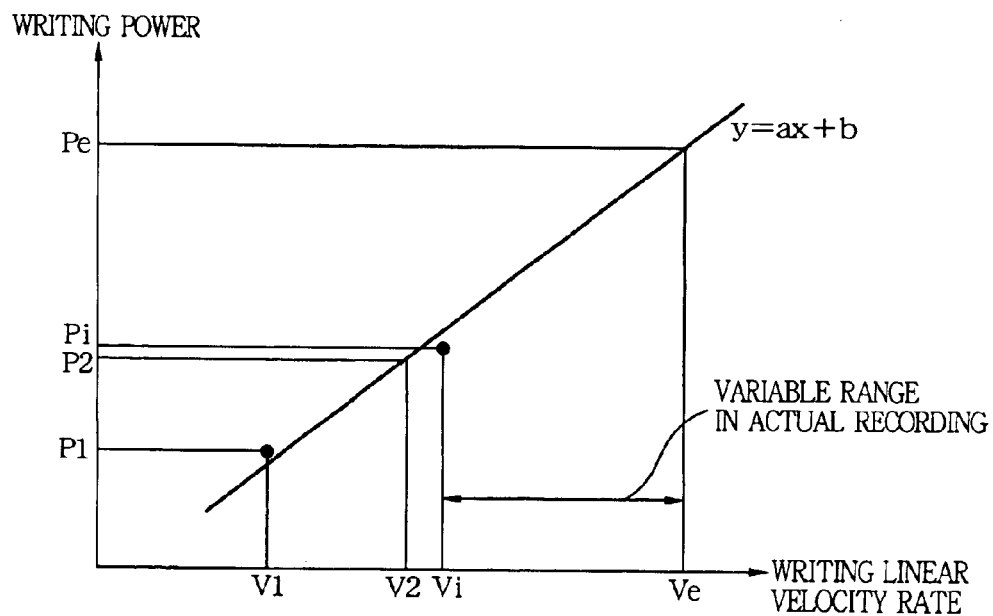
FIG. 17 is a view showing another example of the technique for obtaining a value b in a writing power characteristic y=ax+b in test recording with respect to the disk A.
Figure 18:
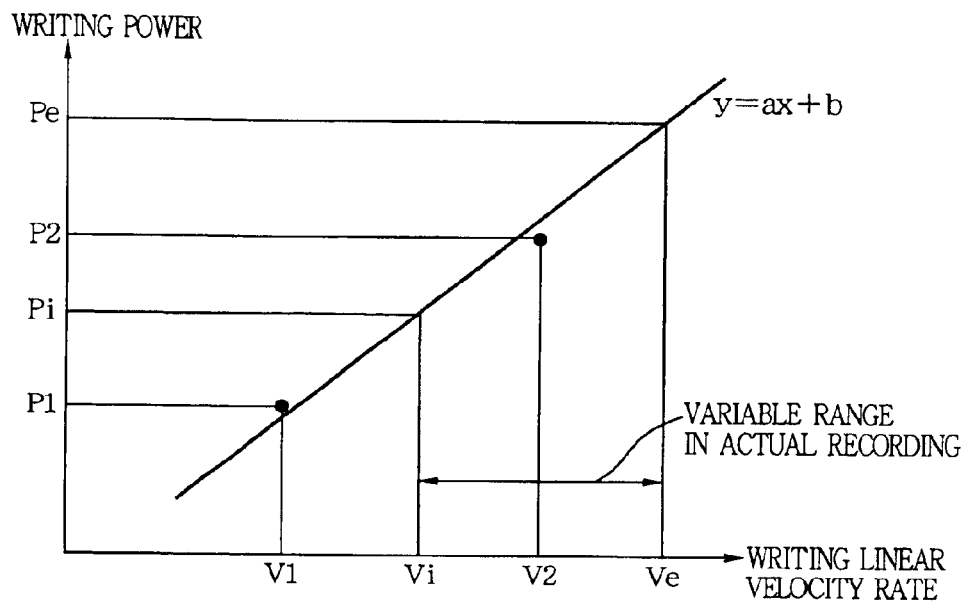
FIG. 18 is a view showing still another example of the technique for obtaining a value b in a writing power characteristic y=ax+b in test recording with respect to the disk A.

A concrete example of a technique for calculating and setting the value b in test recording will now be described.
(Technique of FIG. 16)
OPC is carried out with one appropriate linear velocity multiplication factor V1 within a variable range (Vi to Ve) of the linear velocity multiplication factor used in actual recording or out of that variable range (for example, not more than that variable range), and an appropriate writing power (writing power with which the set target value β can be obtained) P1 with that linear velocity multiplication factor is calculated. Further, a value of b which can be a solution of a characteristic function y=ax+b when the writing power P1 is the linear velocity multiplication factor V1 is calculated and set.
(Technique of FIG. 17)
OPC is carried out with two linear velocity multiplication factors (for example, V1=fourfold speed and V2=eightfold speed when Vi=10-fold speed and Ve=16-fold speed) lower than a variable range of the linear velocity multiplication factor used in actual recording, and appropriate writing powers (writing powers with which the set target value β can be obtained) P1 and P2 with the respective linear velocity multiplication factors V1 and V2 are calculated. Furthermore, the value b at which a sum of squares of errors of P1 and P2 relative to the characteristic function y=ax+b can be minimum is calculated and set by the least-squares method. Alternatively, OPC can be carried out with three or more linear velocity multiplication factors lower than a variable range (Vi to Ve) of the linear velocity multiplication factor used in actual recording, and the value b can be similarly calculated and set by the least-squares method. (Technique of FIG. 18)

OPC is carried out with one linear velocity multiplication factor V1 lower than a variable range (Vi to Ve) of the linear velocity multiplication factor used in actual recording and one linear velocity multiplication factor V2 within that range (for example, V1=eightfold speed and V2=12-fold speed when Vi=10-fold speed and Ve=16-fold speed), and appropriate writing powers (writing powers with which the set target value β can be obtained) P1 and P2 are calculated with the respective linear velocity multiplication factors V1 and V2. Moreover, a value b that a sum of squares of error of P1 and P2 relative to the characteristic function y=ax+b is calculated and set by the least-squares method. Alternatively, OPC can be performed with two or more linear velocity multiplication factors lower than a variable range (Vi to Ve) of the linear velocity multiplication factor used in actual recording and one linear velocity multiplication factor within that range, and the value b can be similarly calculated and set by the least-squares method.

EXAMPLE 2

When Using a Cyanine Type CD-R Disk Manufactured by B (Which Will be Referred to as a "Disk B" hereinafter)

Figure 19:
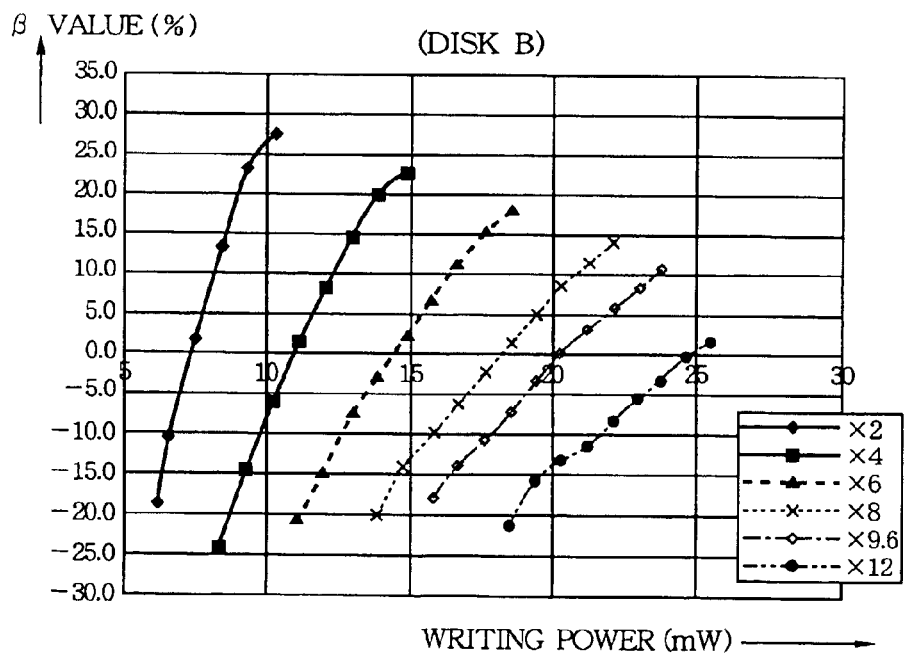
FIG. 19 is a view showing a characteristic of a value β of a reproduction RF signal relative to a writing power when performing recording while changing the writing power with various linear velocity multiplication factors in many ways by using a disk B.
Figure 20:
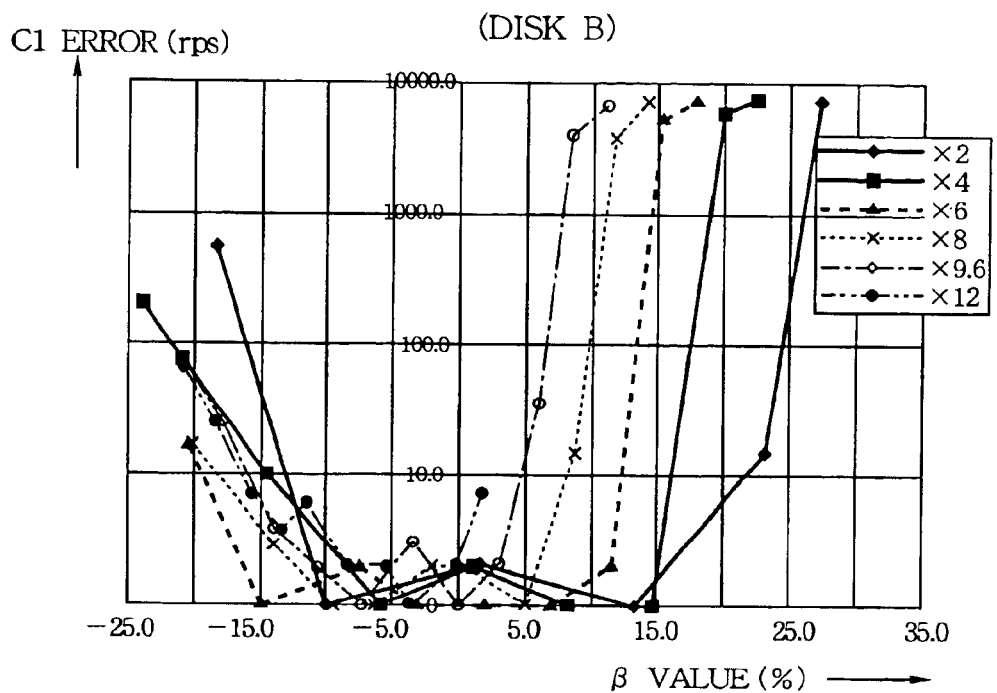
FIG. 20 is a view showing a characteristic of a C1 error relative to a value β when EFM-demodulating a reproduction RF signal caused due to recording illustrated in FIG. 19.
Figure 21:
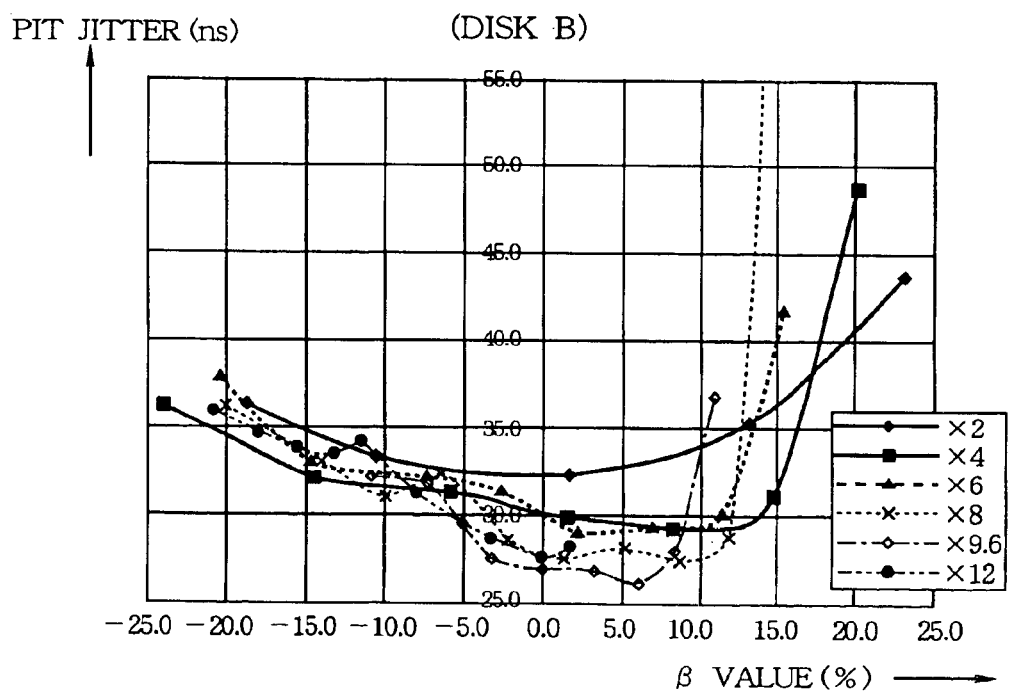
FIG. 21 is a view showing a characteristic of pit jitter relative to a value β of a reproduction RF signal caused due to recording in FIG. 19.
Figure 22:
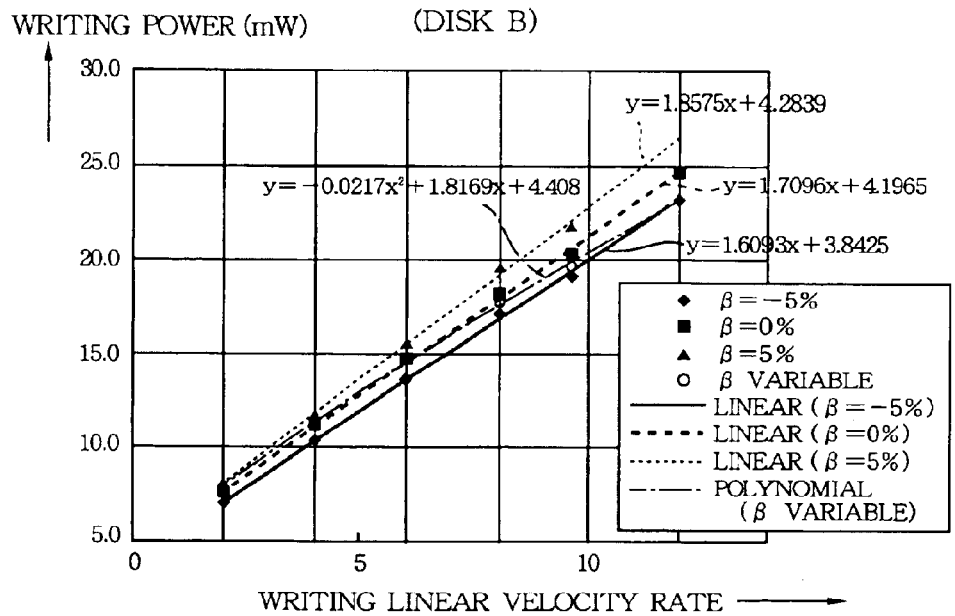
FIG. 22 is a characteristic view of a writing power relative to a writing linear velocity multiplication factor for each value β obtained by developing the characteristic illustrated in FIG. 19.

FIG. 19 shows a characteristic of a value β of a reproduction RF signal relative to a writing power when performing recording by using the disk B while changing the writing power in various linear velocity multiplication factors in many ways. FIG. 20 shows a characteristic of a C1 error relative to the value β when EFM-demodulating the reproduction RF signal. FIG. 21 shows a characteristic of the pit jitter relative to the value β of the reproduction RF signal. FIG. 22 shows a characteristic of the writing power relative to the writing linear velocity multiplication factor for each value β obtained by developing the characteristic illustrated in FIG. 19. According to FIG. 22, the characteristic of the writing power relative to the linear velocity multiplication factor when maintaining the value β to a predetermined value to effect recording can be approximated by the following linear function:

$$y=ax+b$$

where y: a writing power, and x: a linear velocity multiplication factor

However, as shown in FIGS. 20 and 21, in case of the disk B, since the power margin in high-speed recording is narrow (range of the value β is narrow when the C1 error and the pit jitter are low), it is desirable to change a target value of the value β in accordance with the writing linear velocity multiplication factor. A heavy line in FIG. 22 indicates an example of the writing power characteristic relative to the writing linear velocity multiplication factor when the value β is changed so that the C1 error and the pit jitter can maintain small values in accordance with the writing linear velocity multiplication factor. This characteristic can be expressed by the following quadric function:

$$y=ax^2+bx+c$$

In this example, a=−0.0217, b=1.8169 and c=4.408. However, a value c relatively largely changes in accordance with a wavelength of the optical beam. Thus, as the characteristic function of the writing power relative to the writing linear velocity multiplication factor with respect to the disk B, $y=ax^2+bx+c$ (a and b are fixed and c is undetermined) is previously stored in the memory 52, and test recording (OPC) is carried out before actual recording in order to set the value c.

Description will now be given as to a concrete example of a technique for calculating and setting a value c in test recording.

Figure 23:
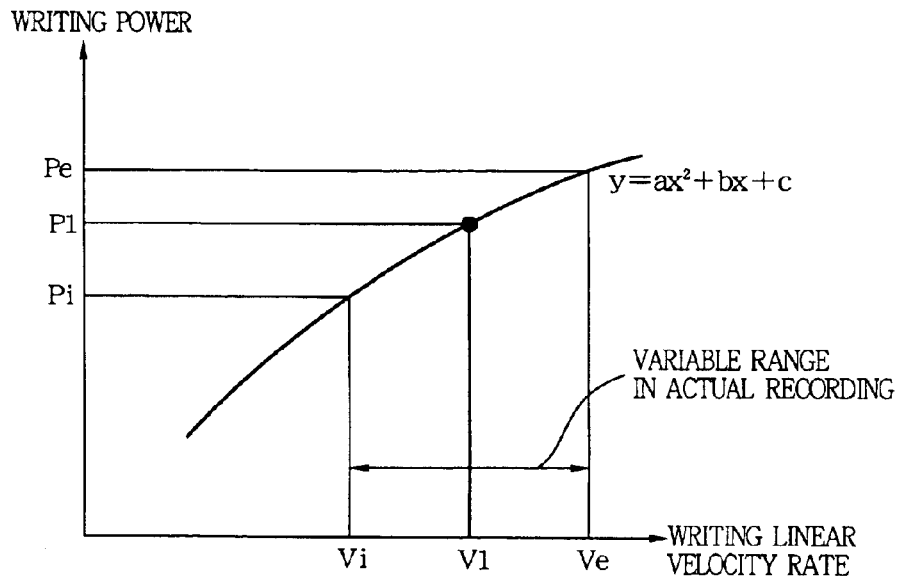
FIG. 23 is a view showing an example of a technique for calculating values of b and c in a writing power characteristic y=ax²+bx+c in test recording with respect to the disk B.

(Technique of FIG. 23)

OPC is carried out with one appropriate linear velocity multiplication factor within a variable range (Vi to Ve) of the linear velocity multiplication factor used in actual recording or out of that variable range (for example, not more than that variable range), and an appropriate writing power (writing power with which the set target value β can be obtained) P1 is calculated with that linear velocity multiplication factor. In addition, a value c which can be a solution of the characteristic function $y=ax^2+bx+c$ when the writing power P1 is the linear velocity multiplication factor V1 is calculated and set.

Figure 24:
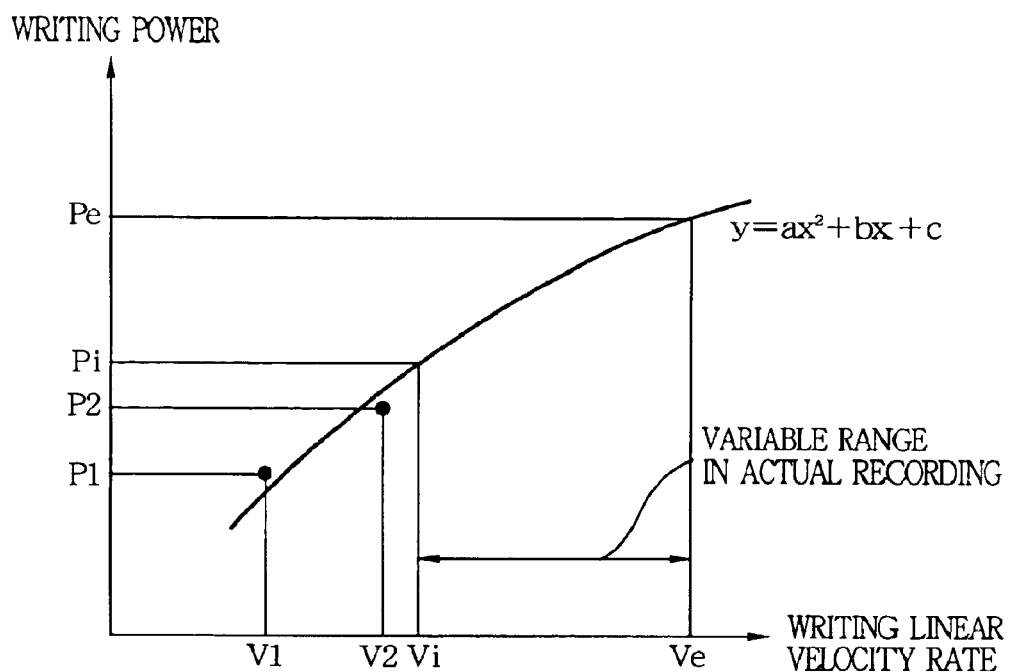
FIG. 24 is a view showing another example of the technique for calculating values of b and c in a writing power characteristic y=ax²+bx+c in test recording with respect to the disk B.

(Technique of FIG. 24)

OPC is effected with two linear velocity multiplication factors V1 and V2 (for example, V1=fourfold speed and V2=eightfold speed when Vi=10-fold speed and Ve=16-fold speed) lower than a variable range (Vi to Ve) of the linear velocity multiplication factor used in actual recording, and appropriate writing powers (writing powers with which the set target value β can be obtained in accordance with each of the linear velocity multiplication factors 1 and V2) P1 and P2 are calculated with the respective linear velocity multiplication factors V1 and V2. Additionally, a value c that a sum of squares of errors of P1 and P2 relative to the characteristic function $y=ax^2+bx+c$ can be minimum is calculated and set by the least-squares method. Alternatively, OPC can be conducted with three or more linear velocity multiplication factors lower than a variable range (Vi to Ve) of the linear velocity multiplication factor used in actual recording, and the value c can be similarly calculated and set by the least-squares method.

Figure 25:
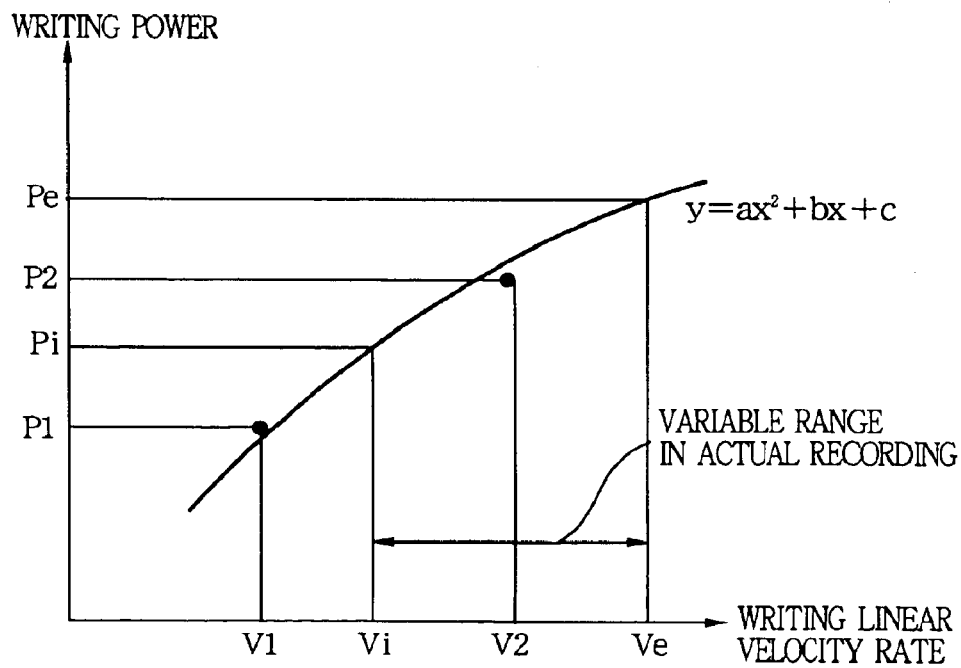
FIG. 25 is a view showing still another example of the technique for calculating values of b and c in a writing power characteristic y=ax²+bx+c in test recording with respect to the disk B.

(Technique of FIG. 25)

OPC is carried out with one linear velocity multiplication factor V1 lower than a variable range (Vi to Ve) of the linear velocity multiplication factor used in actual recording and one linear velocity multiplication factor V2 within that range (for example, V1=eightfold speed and V2=12-fold speed when Vi=10-fold speed and Ve=16-fold speed), and appropriate writing powers (writing powers with which the set target value β can be obtained in accordance with each of the linear velocity multiplication factors V1 and V2) P1 and P2 are calculated with the respective linear velocity multiplication factors. Further, a value c that a sum of squares of errors of P1 and P2 relative to the characteristic function $y=ax^2+bx+c$ becomes minimum is calculated and set by the least-squares method. Alternatively, OPC can be carried out with two or more linear velocity multiplication factors lower than a variable range (Vi to Ve) of the linear velocity multiplication factor used in actual recording and one linear velocity multiplication factor within that range, and the value c can be similarly calculated and set by the least-squares method.

EXAMPLE 3

When Using a Phthalocyanine Type CD-R Disk Manufactured by C (Which Will be Referred to as a "Disk C" hereinafter)

Figure 26:
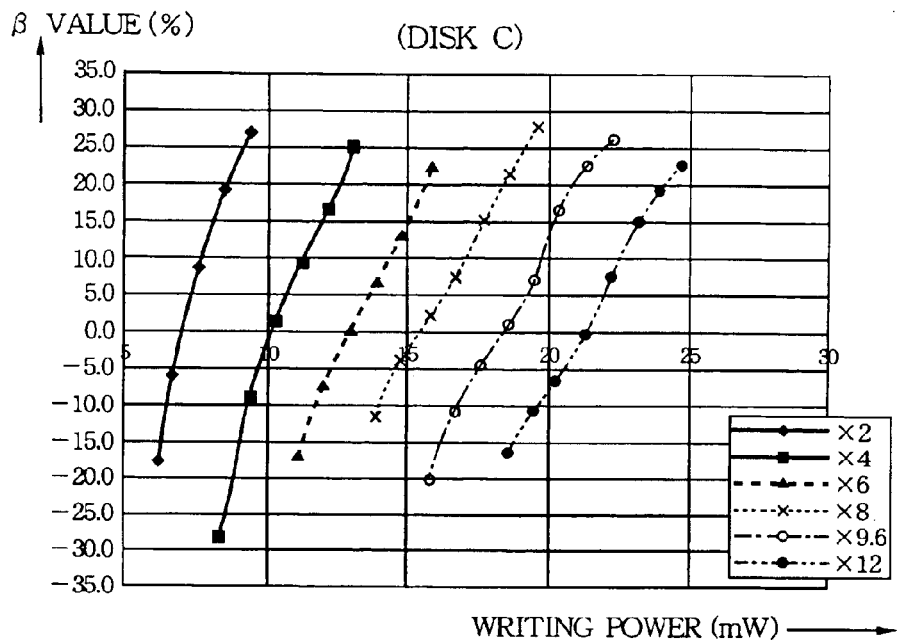
FIG. 26 is a view showing a characteristic of a value β of a reproduction RF signal relative to a writing power when performing recording while changing the writing power in various linear velocity multiplication factors in may ways by using a disk B.
Figure 27:
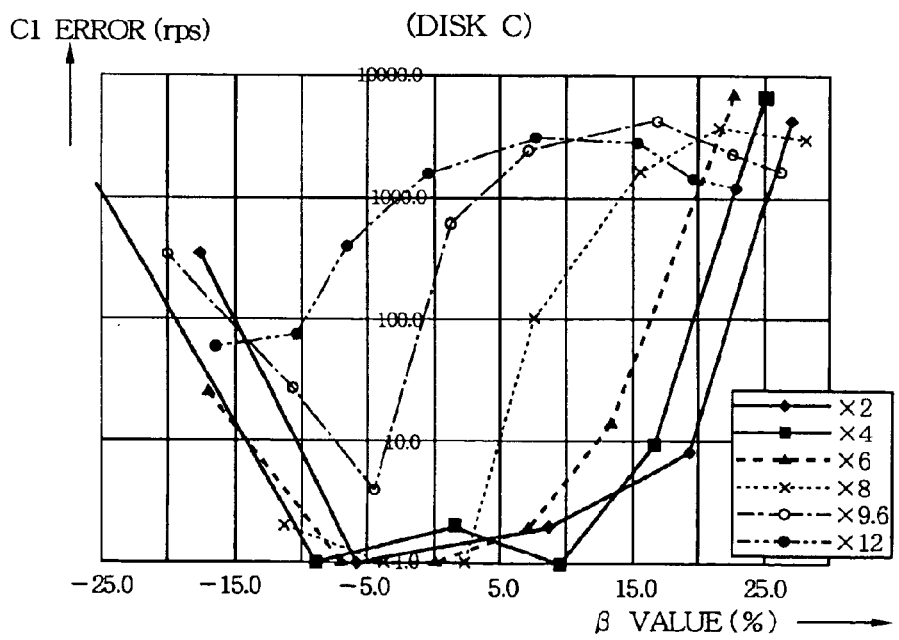
FIG. 27 is a view showing a characteristic of a C1 error relative to a value β when EFM-demodulating a reproduction RF signal caused due to recording illustrated in FIG. 26.
Figure 28:
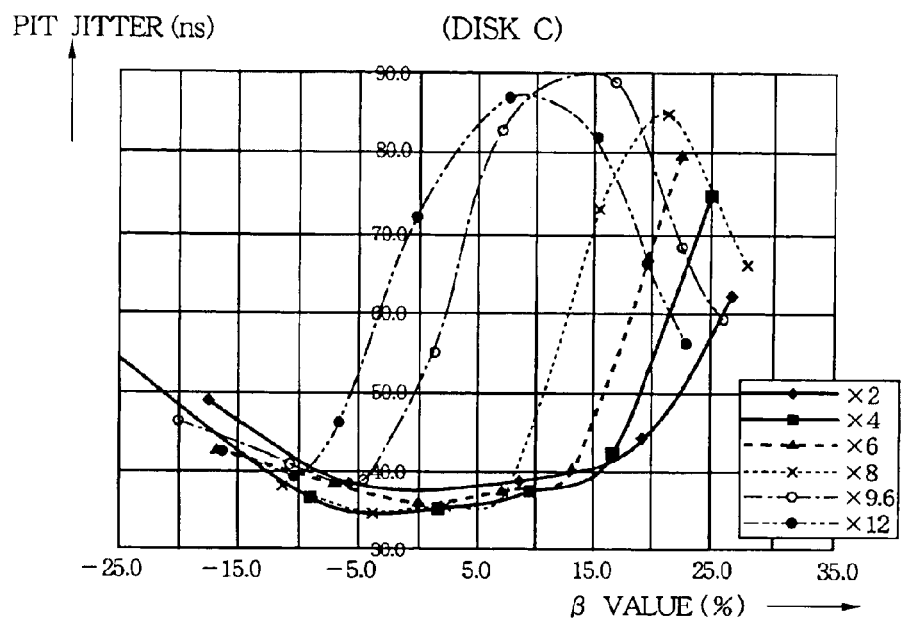
FIG. 28 is a view showing a characteristic of pit jitter relative to a value β of a reproduction RF signal caused due to recording illustrated in FIG. 26.
Figure 29:
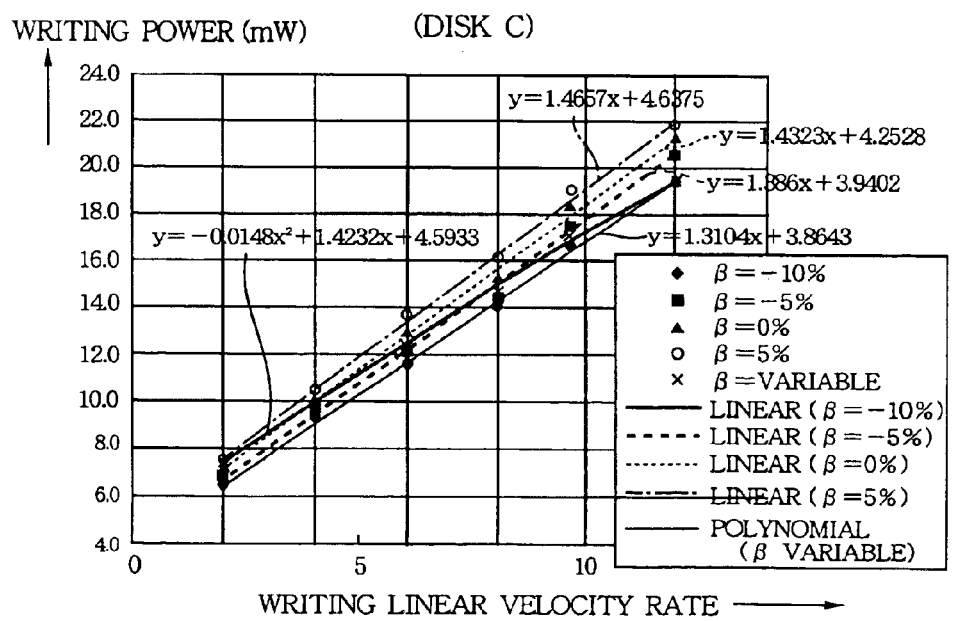
FIG. 29 is a characteristic view of a writing power relative to a writing linear velocity multiplication factor for each value β obtained by developing the characteristic illustrated in FIG. 26.

FIG. 26 shows a characteristic of a value β of a reproduction RF signal relative to a writing power when recording is carried out by using a disk C while changing the writing power in various linear multiplication factors in many ways. FIG. 27 shows a characteristic of a C1 error relative to the value β when EFM-demodulating the reproduction RF signal. FIG. 28 shows a characteristic of the pit jitter relative to the value β of the reproduction RF signal. FIG. 29 shows a characteristic of a writing power relative to a writing linear velocity multiplication factor for each value β calculated by developing the characteristic illustrated in FIG. 26. According to FIG. 29, the characteristic of the writing power relative to the linear velocity multiplication factor when maintaining the value β to a predetermined value to effect recording can be approximated by the following linear function:

$$y=ax+b$$

where y: a writing power x: a linear velocity multiplication factor

However, as shown in FIGS. 27 and 28, in case of the disk C, since the power margin in high-speed recording is narrow (a range of the value β is narrow when the C1 error and the pit jitter are low), it is desirable to change a target value of the value β in accordance with the writing linear velocity multiplication factor. A heavy line in FIG. 29 indicates an example of a characteristic of a writing power relative to a writing linear velocity multiplication factor when the value β is changed so that the C1 error and the pit jitter maintain small values in accordance with the writing linear velocity multiplication factor. This characteristic is expressed by the following quadric function:

$$y=ax^2+bx+c$$

In this example, a=−0.0148, b=1.4232 and c=4.5933. However, a value c relatively largely changes in accordance with a wavelength of the optical beam. Therefore, as a characteristic function of the writing power relative to the writing linear velocity multiplication factor concerning the disk C, $y=ax^2+bx+c$ (a and b are fixed and c is undetermined) is previously stored in the memory 52, and test recording (OPC) is carried out before actual recording in order to set the value c. As a technique for calculating and setting the value c in test recording, techniques similar to those shown in FIGS. 23 to 25 in connection with the disk B can be used.

Description will now be given as to a concrete example of a technique for setting a characteristic function of a writing power relative to a writing linear velocity multiplication factor when an optical disk whose type is not stored in the memory 52 is inserted.

Figure 30:
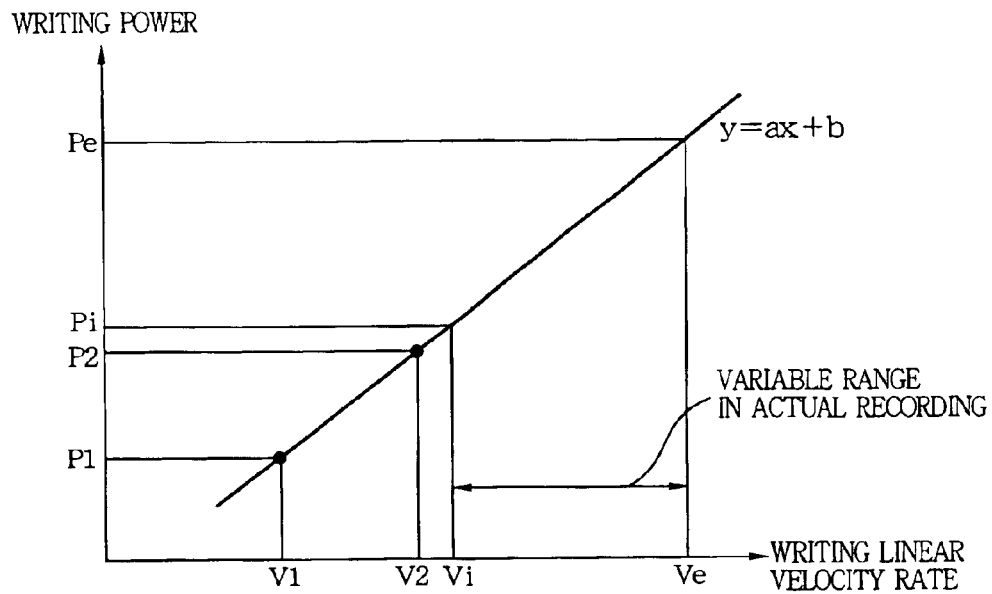
FIG. 30 is a view showing an example of a technique for setting a characteristic function of a writing power relative to a writing linear velocity multiplication factor when an optical disk whose type is not stored in a memory 52 in FIG. 1 is inserted.

(Technique of FIG. 30)

OPC is carried out with two linear velocity multiplication factors V1 and V2 (for example, V1=fourfold speed and V2=eightfold speed when Vi=10-fold speed and Ve=16-fold speed) lower than a variable range (Vi to Ve) of the linear velocity multiplication factor used in actual recording, and appropriate writing powers (writing powers with which a set target β can be obtained) P1 and P2 are calculated with the respective linear velocity multiplication factors V1 and V2. Further, a characteristic function y=ax+b in which P1 and P2 can be solutions is calculated and set. Alternatively, OPC is performed with three or more linear velocity multiplication factors lower than a variable range (Vi to Ve) of the linear velocity multiplication factor used in actual recording, and the entire characteristic function y=ax+b is obtained by the least-squares method.

Alternatively, these three or more appropriate writing power values can be connected by a straight line or a curved line, and linear approximation or curvilinear approximation can be used to obtain and set the characteristic function.

Figure 31:
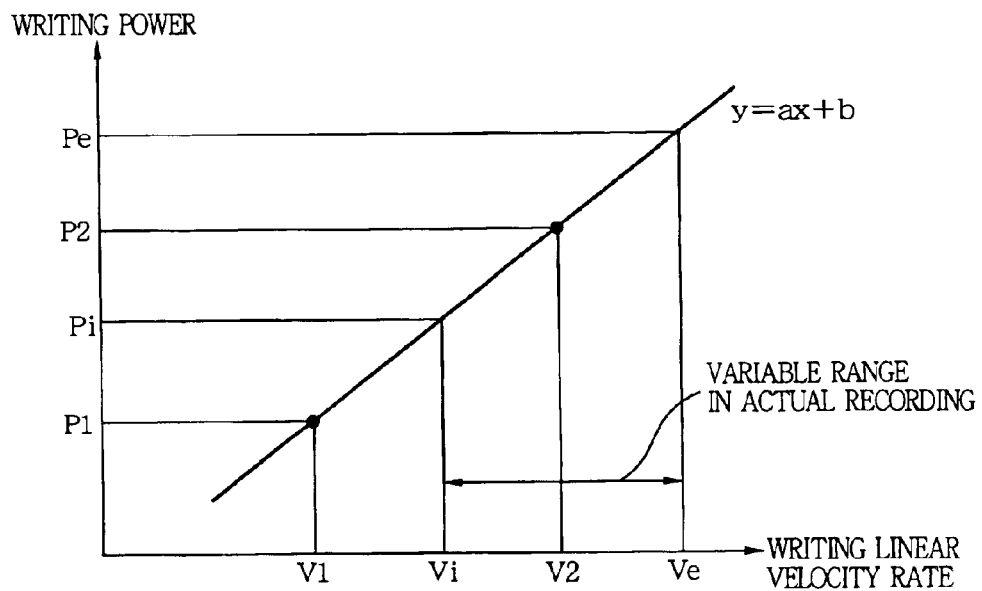
FIG. 31 is a view showing another example of the technique for setting a characteristic function of a writing power relative to a writing linear velocity multiplication factor when an optical disk whose type is not stored in a memory 52 in FIG. 1 is inserted.

(Technique of FIG. 31)

OPC is conducted with one linear velocity multiplication factor V1 lower than a variable range (Vi to Ve) of the linear velocity multiplication factor used in actual recording and one linear velocity multiplication factor V2 within that range (for example, V1=eightfold speed and V2=12-fold speed when Vi=10-fold speed and Ve=16-fold speed), and appropriate writing powers (writing powers with which a set target value β can be obtained) P1 and P2 are calculated with the respective linear velocity multiplication factors V1 and V2. Furthermore, a characteristic function y=ax+b in which P1 and P2 can be solutions is obtained and set. Alternatively, OPC is performed with two or more linear velocity multiplication factors lower than a variable range (Vi to Ve) of the linear velocity multiplication factor used in actual recording and one linear velocity multiplication factor within that range, and the entire characteristic function y=ax+b is obtained by the least-squares method. Conceivably, these three or more writing power values can be connected by a straight line or a curved line, and linear approximation or curvilinear approximation can be used to obtain and set the characteristic function.

It is to be noted that the value β is used as a parameter concerning a reproduction signal quality level in the former embodiment, but it is possible to use only the CI error or the pit jitter, or any other parameter concerning the reproduction signal quality level.

What is claimed is:

1. An optical disk recording method for performing recording of data on an optical disk by controlling an irradiation time (n+k)T of a writing optical beam to form a pit length corresponding to the data, where T: a time corresponding to a unit pit length;

n: a multiple number (integer number) of the pit length to be formed relative to the unit pit length; and k: a correction quantity wherein the method comprises the steps of:

recording data while varying a linear velocity multiplication factor of the optical disk;

increasing a power of the writing optical beam as the linear velocity multiplication factor rises;

changing a value of the correction quantity k in accordance with the linear velocity multiplication factor when the same is less than a predetermined critical linear velocity multiplication factor; and fixing a value of the correction quantity k when the linear velocity multiplication factor is not less than the predetermined critical linear velocity multiplication factor.

2. The optical disk recording method according to claim 1, wherein the predetermined critical linear velocity multiplication factor is set to eight times as much as a nominal standard linear velocity of the optical disk.

3. The optical disk recording method according to claim 1, wherein the step of recording records the data while varying the linear velocity multiplication factor through a variable range in accordance with a radial position of the writing optical beam on the optical disk, such that the critical linear velocity multiplication factor is predetermined in the middle of the variable range of the linear velocity multiplication factor.

4. The optical disk recording method according to claims 3, wherein the optical disk is rotated at a constant angular speed for recording the data such that the linear velocity multiplication factor is controlled to vary in accordance with a radial position of the writing optical beam on the optical disk.

5. The optical disk recording method according to claim 4, further comprising the step of fixing the variable linear velocity multiplication factor after the same reaches a predetermined level which is determined by an angular rotation speed of the optical disk and time information read from a wobble of the optical disk, thereby the recording being performed with the fixed linear velocity multiplication factor.

6. An optical disk recording method for performing recording of data with a variable linear velocity multiplication factor in accordance with a radial position of an irradiation optical beam on an optical disk, the method comprising:

carrying out a test recording before starting an actual recording at a plurality of test linear velocity multiplication factors lower than a variable range of an actual linear velocity multiplication factor used in the actual recording so as to obtain an appropriate writing power of the irradiation optical beam for each of the test linear velocity multiplication factors;

setting a characteristic of an appropriate writing power in function of the radial position of the irradiation optical beam for the actual linear velocity multiplication factor based on the appropriate writing powers obtained for each of the test linear velocity multiplication factors; and carrying out the actual recording such that an appropriate writing power of the irradiation optical beam is calculated based on the set characteristic for the actual linear velocity multiplication factor in accordance with the radial position of the irradiation optical beam.

7. The optical disk recording method according to claim 6, wherein the step of setting sets the characteristic in the form of a linear function or a quadratic or higher-order function.

8. The optical disk recording method according to claims 6, wherein the optical disk is rotated at a constant angular speed for recording the data such that the linear velocity multiplication factor is controlled to vary in accordance with a radial position of the irradiation optical beam on the optical disk.

9. The optical disk recording method according to claim 8, further comprising the step of fixing the variable linear velocity multiplication factor after the same reaches a predetermined level which is determined by an angular rotation speed of the optical disk and time information read from a wobble of the optical disk, thereby the recording being performed with the fixed linear velocity multiplication factor.

10. An optical disk recording method for performing recording of data at a variable linear velocity multiplication factor in accordance with a radial position of an irradiation optical beam on an optical disk, the method comprising the steps of:

carrying out a test recording before starting an actual recording at a first linear velocity multiplication factor within a variable range of an actual linear velocity multiplication factor used in the actual recording and at a second linear velocity multiplication factor below the variable range of the actual linear velocity multiplication factor so as to obtain an appropriate writing power of the irradiation optical beam for each of the first and second linear velocity multiplication factors;

setting a characteristic of an appropriate writing power in function of the radial position of the irradiation optical beam for the actual linear velocity multiplication factor based on the appropriate writing powers obtained for each of the first and second linear velocity multiplication factors; and carrying out the actual recording such that an appropriate writing power of the irradiation optical beam is calculated based on the set characteristic for the actual linear velocity multiplication factor in accordance with the radial position of the irradiation optical beam.

11. The optical disk recording method according to claim 10, wherein the step of setting sets the characteristic in the form of a linear function or a quadratic or higher-order function.

12. The optical disk recording method according to claim 10, wherein the optical disk is rotated at a constant angular speed for recording the data such that the linear velocity multiplication factor is controlled to vary in accordance with a radial position of the irradiation optical beam on the optical disk.

13. The optical disk recording method according to claim 12, further comprising the step of fixing the variable linear velocity multiplication factor after the same reaches a predetermined level which is determined by an angular rotation speed of the optical disk and time information read from a wobble of the optical disk, thereby the recording being performed with the fixed linear velocity multiplication factor.

14. An optical disk recording method for performing recording of data at a variable linear velocity multiplication factor in accordance with a radial position of a irradiation optical beam on an optical disk, the method comprising the steps of:

performing an actual recording with a variable writing power y=ax+b of the irradiation optical beam in accordance with a linear velocity multiplication factor x where the constant a is determined to a fixed value according to a type of the optical disk;

performing a test recording before starting the actual recording such that the test recording is carried out with a test linear velocity multiplication factor to obtain an appropriate writing power of the irradiation optical beam; and setting the constant b by solving the function y=ax+b with using the results of the test recording where y=the appropriate writing power and x=the test linear velocity multiplication factor, whereby the actual recording can be performed with an appropriate writing power y calculated based on the function y=ax+b having the set constants a and b.

15. The optical disk recording method according to claim 14, wherein the optical disk is rotated at a constant angular speed for recording the data such that the linear velocity multiplication factor is controlled to vary in accordance with a radial position of the irradiation optical beam on the optical disk.

16. The optical disk recording method according to claim 15, further comprising the step of fixing the variable linear velocity multiplication factor after the same reaches a predetermined level which is determined by an angular rotation speed of the optical disk and time information read from a wobble of the optical disk, thereby the recording being performed with the fixed linear velocity multiplication factor.

17. An optical disk recording method for performing recording of data at a variable linear velocity multiplication factor in accordance with a radial position of a irradiation optical beam on an optical disk, the method comprising the steps of:

performing an actual recording with a variable writing power y=ax+b of the irradiation optical beam in accordance with a linear velocity multiplication factor x where the constant a is set to a fixed value according to a type of the optical disk;

performing a test recording before starting the actual recording such that the test recording is carried out at a plurality of test linear velocity multiplication factors to obtain an appropriate writing power of the irradiation optical beam at each of the test linear velocity multiplication factors; and setting the constant b by solving the function y=ax+b with using the results of the test recording while minimizing a sum of squares of errors of the obtained appropriate writing powers, whereby the actual recording can be performed with an appropriate writing power y calculated based on the function y=ax+b having the set constants a and b.

18. The optical disk recording method according to claim 17, wherein the optical disk is rotated at a constant angular speed for recording the data such that the linear velocity multiplication factor is controlled to vary in accordance with a radial position of the irradiation optical beam on the optical disk.

19. The optical disk recording method according to claim 18, further comprising the step of fixing the variable linear velocity multiplication factor after the same reaches a predetermined level which is determined by an angular rotation speed of the optical disk and time information read from a wobble of the optical disk, thereby the recording being performed with the fixed linear velocity multiplication factor.

20. An optical disk recording method for performing recording of data at a variable linear velocity multiplication factor in accordance with a radial position of a irradiation optical beam on an optical disk, the method comprising the steps of:

performing an actual recording with a variable writing power y=ax2+bx+c of the irradiation optical beam in accordance with a linear velocity multiplication factor x where the constants a and b are determined to a fixed value according to a type of the optical disk;

performing a test recording before starting the actual recording such that the test recording is carried out with a test linear velocity multiplication factor to obtain an appropriate writing power of the irradiation optical beam; and setting the constant c by solving the function y=ax2+bx+c with using the results of the test recording where y=the obtained appropriate writing power and x=the test linear velocity multiplication factor, whereby the actual recording can be performed with an appropriate writing power y calculated based on the function y=ax2+bx+c having the set constants a, b and c.

21. The optical disk recording method according to claim 20, wherein the optical disk is rotated at a constant angular speed for recording the data such that the linear velocity multiplication factor is controlled to vary in accordance with a radial position of the irradiation optical beam on the optical disk.

22. The optical disk recording method according to claim 21, further comprising the step of fixing the variable linear velocity multiplication factor after the same reaches a predetermined level which is determined by an angular rotation speed of the optical disk and time information read from a wobble of the optical disk, thereby the recording is performed with the fixed linear velocity multiplication factor.

23. An optical disk recording method for performing recording of data at a variable linear velocity multiplication factor in accordance with a radial position of an irradiation optical beam on an optical disk, the method comprising the steps of:

performing an actual recording with a variable writing power y=ax2+bx+c of the irradiation optical beam in accordance with a linear velocity multiplication factor x of the optical disk where the constants a and b are set to a fixed value according to a type of the optical disk;

performing a test recording before starting the actual recording such that the test recording is carried out at a plurality of test linear velocity multiplication factors to obtain an appropriate writing power of the irradiation optical beam at each of the test linear velocity multiplication factors; and setting the constant c by solving the function y=ax2+bx+c with using the results of the test recording while minimizing a sum of squares of errors of the obtained appropriate writing powers, whereby the actual recording can be performed with an appropriate writing power y calculated based on the function y=ax2+bx+c having the set constants a, b and c.

24. The optical disk recording method according to claim 23, wherein the optical disk is rotated at a constant angular speed for recording the data such that the linear velocity multiplication factor is controlled to vary in accordance with a radial position of the irradiation optical beam on the optical disk.

25. The optical disk recording method according to claim 24, further comprising the step of fixing the variable linear velocity multiplication factor after the same reaches a predetermined level which is determined by an angular rotation speed of the optical disk and time information read from a wobble of the optical disk, thereby the recording is performed with the fixed linear velocity multiplication factor.

26. An optical disk recording apparatus comprising:

a disk servo that is provided for driving an optical disk to rotate;

an optical pickup that is provided for performing recording and reproducing of data by irradiating the optical disk with an optical beam;

an optical power control section that is provided for controlling a power of the optical beam irradiated from the optical pickup;

a strategy section that is provided for controlling an irradiation time of a writing optical beam in accordance with a pit length to be formed to (n+k)T, where T is a time corresponding to a unit pit length, n is a multiple number (integer number) of the pit length to be formed relative to the unit pit length, and k is a correction quantity;

a storage section that is provided for storing therein a first characteristic that a writing power of the optical beam is increased as a linear velocity multiplication factor of the optical disk is raised, and for storing therein a second characteristic that the correction quantity k varies in accordance with the linear velocity multiplication factor when the same is less than a predetermined critical linear velocity multiplication factor while the correction quantity k is fixed when the linear velocity multiplication factor is not less than the predetermined critical velocity multiplication factor; and a system control section that instructs the writing power of the optical beam to the optical power control section based on the first characteristic of the writing power of the optical beam stored in the storage section in accordance with the linear velocity multiplication factor at the time of recording data on the optical disk, and that instructs the correction quantity k to the strategy section based on the second characteristic of the correction quantity k stored in the storage section.

27. The optical disk recording apparatus according to claim 26, wherein the storage section stores therein the second characteristic of the correction quantity k in function of the linear velocity multiplication factor in accordance with a type of the optical disk, and the system control section discriminates the type of the optical disk and instructs the correction quantity k to the strategy section based on the second characteristic corresponding to the discriminated type of the optical disk among various second characteristics of correction quantity k stored in the storage section.

28. The optical disk recording apparatus according to claim 26, wherein the system control section issues a command for driving the disk servo by a constant angular velocity control on an inner peripheral side of the optical disk when a radial position of the optical beam is inside a border position, and for driving the disk servo by a constant linear velocity control on an outer peripheral side of the optical disk with a final linear velocity multiplication factor used in the constant angular velocity control when a radial position of the optical beam is outside the border position.

29. The optical disk recording apparatus according to claim 28, further comprising a time information reading section that is provided for reading time information from a wobble of the optical disk, and the system control section calculates a linear velocity of the optical disk based on a rotation speed of the optical disk under the constant angular velocity control and the time information read from the wobble of the optical disk, and performs the constant linear velocity control on the outer peripheral side to execute recording of the data after the calculated linear velocity reaches a predetermined value.

30. An optical disk recording apparatus comprising:

a disk servo that is provided for driving an optical disk to rotate;

an optical pickup that is provided for performing recording of data by irradiating an optical beam on the optical beam and reproducing of data in the form of a reproduction signal;

an optical power control section that is provided for controlling a power of the optical beam irradiated from the optical pickup;

a signal quality level detection section that is provided for calculating a predetermined parameter concerning a quality level of the reproduction signal based on the reproduction signal reproduced by the optical pickup; and a system control section that performs a test recording with a plurality of test linear velocity multiplication factors of the optical disk less than a variable range of an actual linear velocity multiplication factor used in an actual recording within a predetermined test area of the optical disk before the actual recording, then obtains an appropriate writing optical power for each of the test linear velocity multiplication factors based on the reproduction signal in the test recording, sets a characteristic of an appropriate writing power relative to a linear velocity multiplication factor based on the appropriate writing powers obtained for each of the linear velocity multiplication factors, and calculates an appropriate writing power based on the characteristic in accordance with a linear velocity multiplication factor dependent on a radial position of the writing optical beam, thereby instructing the calculated writing optical power to the optical power control section in the actual recording.

31. The optical disk recording apparatus according to claim 30, wherein the system control section issues a command for driving the disk servo by a constant angular velocity control on an inner peripheral side of the optical disk when a radial position of the optical beam is inside a border position, and for driving the disk servo by a constant linear velocity control on an outer peripheral side of the optical disk with a final linear velocity multiplication factor used in the constant angular velocity control when a radial position of the optical beam is outside the border position.

32. The optical disk recording apparatus according to claim 31, further comprising a time information reading section that is provided for reading time information from a wobble of the optical disk, and the system control section calculates a linear velocity of the optical disk based on a rotation speed of the optical disk under the constant angular velocity control and the time information read from the wobble of the optical disk, and performs the constant linear velocity control on the outer peripheral side to execute recording of the data after the calculated linear velocity reaches a predetermined value.

33. An optical disk storing apparatus comprising:

a disk servo that is provided for driving an optical disk to rotate;

an optical pickup that is provided for performing recording of data by irradiating an optical beam on the optical disk and reproducing of data in the form of a reproduction signal;

an optical power control section that is provided for controlling a power of the optical beam irradiated from the optical pickup;

a signal quality level detection section that is provided for calculating a predetermined parameter concerning a quality level of the reproduction signal based on the reproduction signal reproduced by the optical pickup; and a system control section that performs a test recording at a first test linear velocity multiplication factor of the optical disk within a variable range of an actual linear velocity multiplication factor used in an actual recording before the actual recording and at a second test linear velocity multiplication factor of the optical disk less than the variable range of the actual linear velocity multiplication factor used in the actual recording before the actual recording, then obtains an appropriate writing power for each of the first and second test linear velocity multiplication factors based on the predetermined parameter concerning the quality level of the reproduction signal obtained in the test recording, sets a characteristic of an appropriate writing power relative to a linear velocity multiplication factor based on the appropriate writing powers obtained for each of the first and second linear velocity multiplication factors, and calculates an appropriate writing power based on the set characteristic in accordance with a linear velocity multiplication factor dependent on a radial position of the writing optical beam, thereby instructing the calculated writing power to the optical power control section in the actual recording.

34. The optical disk recording apparatus according to claim 33, wherein the system control section issues a command for driving the disk servo by a constant angular velocity control on an inner peripheral side of the optical disk when a radial position of the optical beam is inside a border position, and for driving the disk servo by a constant linear velocity control on an outer peripheral side of the optical disk with a final linear velocity multiplication factor used in the constant angular velocity control when a radial position of the optical beam is outside the border position.

35. The optical disk recording apparatus according to claim 34, further comprising a time information reading section that is provided for reading time information from a wobble of the optical disk, and the system control section calculates a linear velocity of the optical disk based on a rotation speed of the optical disk under the constant angular velocity control and the time information read from the wobble of the optical disk, and performs the constant linear velocity control on the outer peripheral side to execute recording of the data after the calculated linear velocity reaches a predetermined value.

36. An optical disk recording apparatus for performing recording of data at a variable linear velocity multiplication factor in accordance with a radial position of an optical disk, comprising:

a disk servo that is provided for driving an optical disk to rotate;

an optical pickup that is provided for performing recording of data and reproducing of data in the form of a reproduction signal by irradiating the optical disk with an optical beam;

an optical power control section that is provided for controlling a power of the optical beam irradiated from the optical pickup;

a signal quality level detection section that is provided for calculating a predetermined parameter concerning a quality level of the reproduction signal based on the reproduction signal reproduced by the optical pickup;

a storage section that is provided for storing therein a characteristic of a writing power y of the optical beam in the form of a function y=ax+b with respect to a writing linear velocity multiplication factor x, where the constant a has a fixed value according to a disk type; and a system control section that performs a test recording of data with a test linear velocity multiplication factor in a predetermined test area before an actual recording of data on the optical disk, obtaining a writing power for the test linear velocity multiplication factor based on the calculated parameter concerning the quality level of the reproduction signal detected in the test recording, calculates a value of the constant b by solving the function y=ax+b with using the results of the test recording, and calculates an appropriate writing power based on the function y=ax+b in accordance with a linear velocity multiplication factor dependent on the radial position of the optical beam, thereby instructing the calculated writing power to the optical power control section in the actual recording.

37. The optical disk recording apparatus according to claim 36, wherein the storage section stores therein a characteristic of a writing power y of an optical beam relative to a linear velocity multiplication factor x in accordance with each type of an optical disk, and the system control section discriminates a type of the optical disk and instructs the optical writing power y of the optical beam based on a characteristic corresponding to the discriminated type of the optical disk among various characteristics of various types stored in the storage section.

38. The optical disk recording apparatus according to claim 36, wherein the system control section issues a command for driving the disk servo by a constant angular velocity control on an inner peripheral side of the optical disk when a radial position of the optical beam is inside a border position, and for driving the disk servo by a constant linear velocity control on an outer peripheral side of the optical disk with a final linear velocity multiplication factor used in the constant angular velocity control when a radial position of the optical beam is outside the border position.

39. The optical disk recording apparatus according to claim 38, further comprising a time information reading section that is provided for reading time information from a wobble of the optical disk, and the system control section calculates a linear velocity of the optical disk based on a rotation speed of the optical disk under the constant angular velocity control and the time information read from the wobble of the optical disk, and performs the constant linear velocity control on the outer peripheral side to execute recording of the data after the calculated linear velocity reaches a predetermined value.

40. An optical disk recording apparatus for performing recording of data at a variable linear velocity multiplication factor in accordance with a radial position of an optical disk, comprising:

a disk servo that is provided for driving an optical disk to rotate;

an optical pickup that is provided for performing recording of data and reproducing of data in the form of a reproduction signal by irradiating the optical disk with an optical beam;

an optical power control section that is provided for controlling a power of the optical beam irradiated from the optical pickup;

a signal quality level detection section that is provided for calculating a predetermined parameter concerning a quality level of the reproduction signal based on the reproduction signal reproduced by the optical pickup;

a storage section that is provided for storing therein a characteristic of a writing power y of the optical beam in the form of a function y=ax+b with respect to a linear velocity multiplication factor x, where the constant a has a fixed value according to a type of an optical disk; and a system control section that performs a test recording of data with a plurality of test linear velocity multiplication factors in a predetermined test area before an actual recording of data on the optical disk, obtaining a writing power for each of the test linear velocity multiplication factors based on the calculated parameter concerning the quality level of the reproduction signal detected in the test recording, calculates a value of the constant b by solving the function y=ax+b with using the results of the test recording while minimizing a sum of squares of errors of the obtained writing powers, and calculates an appropriate writing power based on the function y=ax+b in accordance with a linear velocity multiplication factor dependent on the radial position of the optical beam, thereby instructing the calculated appropriate writing power to the optical power control section in the actual recording.

41. The optical disk recording apparatus according to claim 40, wherein the storage section stores therein a characteristic of a writing power y of an optical beam relative to a linear velocity multiplication factor x in accordance with each type of an optical disk, and the system control section discriminates a type of the optical disk and instructs the optical writing power y of the optical beam based on a characteristic corresponding to the discriminated type of the optical disk among various characteristics of various types stored in the storage section.

42. The optical disk recording apparatus according to claim 41, wherein the system control section issues a command for driving the disk servo by a constant angular velocity control on an inner peripheral side of the optical disk when a radial position of the optical beam is inside a border position, and for driving the disk servo by a constant linear velocity control on an outer peripheral side of the optical disk with a final linear velocity multiplication factor used in the constant angular velocity control when a radial position of the optical beam is outside the border position.

43. The optical disk recording apparatus according to claim 42, further comprising a time information reading section that is provided for reading time information from a wobble of the optical disk, and the system control section calculates a linear velocity of the optical disk based on a rotation speed of the optical disk under the constant angular velocity control and the time information read from the wobble of the optical disk, and performs the constant linear velocity control on the outer peripheral side to execute recording of the data after the calculated linear velocity reaches a predetermined value.

44. An optical disk recording apparatus for performing recording of data at a variable linear velocity multiplication factor in accordance with a radial position of an optical disk, comprising:
  a disk servo that is provided for driving an optical disk to rotate;
  an optical pickup that is provided for performing recording of data and reproducing of data in the form of a reproduction signal by irradiating the optical disk with an optical beam;
  an optical power control section that is provided for controlling a power of the optical beam irradiated from the optical pickup;
  a signal quality level detection section that is provided for calculating a predetermined parameter concerning a quality level of the reproduction signal based on the reproduction signal reproduced by the optical pickup;
  a storage section that is provided for storing therein a characteristic of a writing power y of the optical beam in the form of a function $y=ax^2+bx+c$ with respect to a linear velocity multiplication factor x, where the constants a and b have a fixed value according to a type of the optical disk; and
  a system control section that performs a test recording of data with a test linear velocity multiplication factor in a predetermined test area before an actual recording of data on the optical disk, obtains a writing power for the test linear velocity multiplication factor based on the calculated parameter concerning the quality level of the reproduction signal detected in the test recording, calculates a value of the constant c by solving the function $y=ax^2+bx+c$ with using the results of the test recording, and calculates an appropriate writing power based on the function $y=ax^2+bx+c$ in accordance with a linear velocity multiplication factor dependent on the radial position of the optical beam, thereby instructing the calculated appropriate writing power to the optical power control section in the actual recording.

45. The optical disk recording apparatus according to claim 44, wherein the storage section stores therein a characteristic of a writing power y of an optical beam relative to a linear velocity multiplication factor x in accordance with each type of an optical disk, and the system control section discriminates a type of the optical disk and instructs the optical writing power y of the optical beam based on a characteristic corresponding to the discriminated type of the optical disk among various characteristics of various types stored in the storage section.

46. The optical disk recording apparatus according to claim 44, wherein the system control section issues a command for driving the disk servo by a constant angular velocity control on an inner peripheral side of the optical disk when a radial position of the optical beam is inside a border position, and for driving the disk servo by a constant linear velocity control on an outer peripheral side of the optical disk with a final linear velocity multiplication factor used in the constant angular velocity control when a radial position of the optical beam is outside the border position.

47. The optical disk recording apparatus according to claim 46, further comprising a time information reading section that is provided for reading time information from a wobble of the optical disk, and the system control section calculates a linear velocity of the optical disk based on a rotation speed of the optical disk under the constant angular velocity control and the time information read from the wobble of the optical disk, and performs the constant linear velocity control on the outer peripheral side to execute recording of the data after the calculated linear velocity reaches a predetermined value.

48. An optical disk recording apparatus for performing recording of data at a variable linear velocity multiplication factor in accordance with a radial position of an optical disk, comprising:
  a disk servo that is provided for driving an optical disk to rotate;
  an optical pickup that is provided for performing recording of data and reproducing of data in the form of a reproduction signal by irradiating the optical disk with an optical beam;
  an optical power control section that is provided for controlling a power of the optical beam irradiated from the optical pickup;
  a signal quality level detection section that is provided for calculating a predetermined parameter concerning a quality level of the reproduction signal based on the reproduction signal reproduced by the optical pickup;
  a storage section that is provided for storing therein a characteristic of a writing power y of the optical beam in the form of a function $y=ax^2+bx+c$ with respect to a linear velocity multiplication factor x, where the constants a and b have a fixed value according to a type of the optical disk; and
  a system control section that performs a test recording of data with a plurality of test linear velocity multiplication factors in a predetermined test area before an actual recording of data on the optical disk, obtaining a writing power for each of the test linear velocity multiplication factors based on the calculated parameter concerning the quality level of the reproduction signal detected in the test recording, calculates a value of the constant c by solving the function $y=ax^2+bx+c$ with using the results of the test recording while minimizing a sum of squares of errors of the obtained writing powers, and calculates an appropriate writing power based on the function $y=ax^2+bx+c$ in accordance with a linear velocity multiplication factor dependent on the radial position of the optical beam, thereby instructing the calculated appropriate writing power to the optical power control section in the actual recording.

49. The optical disk recording apparatus according to claim 48, wherein the storage section stores therein a characteristic of a writing power y of an optical beam relative to a linear velocity multiplication factor x in accordance with each type of an optical disk, and the system control section discriminates a type of the optical disk and instructs the optical writing power y of the optical beam based on a characteristic corresponding to the discriminated type of the optical disk among various characteristics of various types stored in the storage section.

50. The optical disk recording apparatus according to claim 48, wherein the system control section issues a command for driving the disk servo by a constant angular velocity control on an inner peripheral side of the optical disk when a radial position of the optical beam is inside a border position, and for driving the disk servo by a constant linear velocity control on an outer peripheral side of the optical disk with a final linear velocity multiplication factor used in the constant angular velocity control when a radial position of the optical beam is outside the border position.

51. The optical disk recording apparatus according to claim 50, further comprising a time information reading section that is provided for reading time information from a wobble of the optical disk, and the system control section calculates a linear velocity of the optical disk based on a rotation speed of the optical disk under the constant angular velocity control and the time information read from the wobble of the optical disk, and performs the constant linear velocity control on the outer peripheral side to execute recording of the data after the calculated linear velocity reaches a predetermined value.

52. A machine readable medium for use in an optical disk recording apparatus having a processor, the medium containing program instructions executable by the processor for causing the optical disk recording apparatus to undergo a method of performing recording of data on an optical disk by controlling an irradiation time $(n+k)T$ of a writing optical beam to form a pit length corresponding to the data, where T: a time corresponding to a unit pit length;

n: a multiple number (integer number) of the pit length to be formed relative to the unit pit length; and k: a correction quantity, wherein the method comprises the steps of:

recording data while varying a linear velocity multiplication factor of the optical disk;

increasing a power of the writing optical beam as the linear velocity multiplication factor rises;

changing a value of the correction quantity k in accordance with the linear velocity multiplication factor when the same is less than a predetermined critical linear velocity multiplication factor; and fixing a value of the correction quantity k when the linear velocity multiplication factor is not less than the predetermined critical linear velocity multiplication factor.

53. A machine readable medium for use in an optical disk recording apparatus having a processor, the medium containing program instructions executable by the processor for causing the optical disk recording apparatus to undergo a method of performing recording of data with a variable linear velocity multiplication factor in accordance with a radial position of an irradiation optical beam on an optical disk, wherein the method comprises the steps of:

carrying out a test recording before starting an actual recording at a plurality of test linear velocity multiplication factors lower than a variable range of an actual linear velocity multiplication factor used in the actual recording so as to obtain an appropriate writing power of the irradiation optical beam for each of the test linear velocity multiplication factors;

setting a characteristic of an appropriate writing power in function of the radial position of the irradiation optical beam for the actual linear velocity multiplication factor based on the appropriate writing powers obtained for each of the test linear velocity multiplication factors; and carrying out the actual recording such that an appropriate writing power of the irradiation optical beam is calculated based on the set characteristic for the actual linear velocity multiplication factor in accordance with the radial position of the irradiation optical beam.

54. A machine readable medium for use in an optical disk recording apparatus having a processor, the medium containing program instructions executable by the processor for causing the optical disk recording apparatus to undergo a method of performing recording of data at a variable linear velocity multiplication factor in accordance with a radial position of an irradiation optical beam on an optical disk, wherein the method comprises the steps of:

carrying out a test recording before starting an actual recording at a first linear velocity multiplication factor within a variable range of an actual linear velocity multiplication factor used in the actual recording and at a second linear velocity multiplication factor below the variable range of the actual linear velocity multiplication factor so as to obtain an appropriate writing power of the irradiation optical beam for each of the first and second linear velocity multiplication factors;

setting a characteristic of an appropriate writing power in function of the radial position of the irradiation optical beam for the actual linear velocity multiplication factor based on the appropriate writing powers obtained for each of the first and second linear velocity multiplication factors; and carrying out the actual recording such that an appropriate writing power of the irradiation optical beam is calculated based on the set characteristic for the actual linear velocity multiplication factor in accordance with the radial position of the irradiation optical beam.

55. A machine readable medium for use in an optical disk recording apparatus having a processor, the medium containing program instructions executable by the processor for causing the optical disk recording apparatus to undergo a method of performing recording of data at a variable linear velocity multiplication factor in accordance with a radial position of a irradiation optical beam on an optical disk, wherein the method comprises the steps of:

performing an actual recording with a variable writing power $y=ax+b$ of the irradiation optical beam in accordance with a linear velocity multiplication factor x where the constant a is determined to a fixed value according to a type of the optical disk;

performing a test recording before starting the actual recording such that the test recording is carried out with a test linear velocity multiplication factor to obtain an appropriate writing power of the irradiation optical beam; and setting the constant b by solving the function $y=ax+b$ with using the results of the test recording where y=the appropriate writing power and x=the test linear velocity multiplication factor, whereby the actual recording can be performed with an appropriate writing power y calculated based on the function y=ax+b having the set constants a and b.

56. A machine readable medium for use in an optical disk recording apparatus having a processor, the medium containing program instructions executable by the processor for causing the optical disk recording apparatus to undergo a method of performing recording of data at a variable linear velocity multiplication factor in accordance with a radial position of a irradiation optical beam on an optical disk, wherein the method comprises the steps of:

performing an actual recording with a variable writing power y=ax+b of the irradiation optical beam in accordance with a linear velocity multiplication factor x where the constant a is set to a fixed value according to a type of the optical disk;

performing a test recording before starting the actual recording such that the test recording is carried out at a plurality of test linear velocity multiplication factors to obtain an appropriate writing power of the irradiation optical beam at each of the test linear velocity multiplication factors; and setting the constant b by solving the function y=ax+b with using the results of the test recording while minimizing a sum of squares of errors of the obtained appropriate writing powers, whereby the actual recording can be performed with an appropriate writing power y calculated based on the function y=ax+b having the set constants a and b.

57. A machine readable medium for use in an optical disk recording apparatus having a processor, the medium containing program instructions executable by the processor for causing the optical disk recording apparatus to undergo a method of performing recording of data at a variable linear velocity multiplication factor in accordance with a radial position of a irradiation optical beam on an optical disk, wherein the method comprises the steps of:

performing an actual recording with a variable writing power y=ax2+bx+c of the irradiation optical beam in accordance with a linear velocity multiplication factor x where the constants a and b are determined to a fixed value according to a type of the optical disk;

performing a test recording before starting the actual recording such that the test recording is carried out with a test linear velocity multiplication factor to obtain an appropriate writing power of the irradiation optical beam; and setting the constant c by solving the function y=ax2+bx+c with using the results of the test recording where y=the obtained appropriate writing power and x=the test linear velocity multiplication factor, whereby the actual recording can be performed with an appropriate writing power y calculated based on the function y=ax2+bx+c having the set constants a, b and c.

58. A machine readable medium for use in an optical disk recording apparatus having a processor, the medium containing program instructions executable by the processor for causing the optical disk recording apparatus to undergo a method of performing recording of data at a variable linear velocity multiplication factor in accordance with a radial position of an irradiation optical beam on an optical disk, wherein the method comprises the steps of:

performing an actual recording with a variable writing power y=ax2+bx+c of the irradiation optical beam in accordance with a linear velocity multiplication factor x of the optical disk where the constants a and b are set to a fixed value according to a type of the optical disk;

performing a test recording before starting the actual recording such that the test recording is carried out at a plurality of test linear velocity multiplication factors to obtain an appropriate writing power of the irradiation optical beam at each of the test linear velocity multiplication factors; and setting the constant c by solving the function y=ax2+bx+c with using the results of the test recording while minimizing a sum of squares of errors of the obtained appropriate writing powers, whereby the actual recording can be performed with an appropriate writing power y calculated based on the function y=ax2+bx+c having the set constants a, b and c.

59. An optical disk recording method for performing recording on an optical disk by controlling a recording optical beam irradiation time of a pit length to be formed to (n+k)T, where T: a time corresponding to a unit pit length;

n: a multiple number (natural number) of said pit length to be formed relative to said unit pit length; and k: a correction quantity wherein in case of recording with a variable linear velocity multiplication factor, a recording power of said optical beam is increased as a recording linear velocity multiplication factor is heightened, characterized in that, with a predetermined linear velocity multiplication factor as a boundary, a value of said correction quantity k is changed in accordance with a linear velocity multiplication factor in case of less than said predetermined linear velocity multiplication factor, while a value of said correction quantity k is fixed even if the linear velocity multiplication factor varies in case of not less than said predetermined linear velocity multiplication factor, thereby performing recording.

60. The optical disk recording method according to claim 59, wherein said linear velocity multiplication factor as a boundary is a multiplication factor not less than an octuple speed.

61. The optical disk recording method according to claim 59, wherein recording is performed with a variable linear velocity multiplication factor in accordance with a position o said optical disk in a radial direction, and said linear velocity multiplication factor as a boundary is a linear velocity multiplication factor in the middle of a variable range of said linear velocity multiplication factor.

62. The optical disk recording method according to claim 61, wherein linear velocity multiplication factor variable control recording is executed according to a position on said optical disk in the radial direction by controlling said optical disk by constant angular velocity control.

63. The optical disk recording method according to claim 62, wherein a linear velocity at each point in time is calculated based on a number of revolutions of said constant angular velocity control and time information read from a wobble of said optical disk, and recording is performed by performing constant linear velocity control on the peripheral side and after attainment of said linear velocity to a predetermined value.

64. An optical disk recording apparatus comprising:

a disk servo for driving an optical disk to rotate;

an optical pickup for performing recording and reproduction by irradiating said optical disk with an optical beam;

an optical power control portion for controlling a power of an optical beam outgoing from said optical pickup;

a strategy portion for controlling an irradiation time of a recording optical beam in accordance with a pit length to be formed to (n+k)T, where T: time corresponding to a unit pit length, n: a multiple number (natural number) of said pit length to be formed relative to said unit pit length, and k: a correction quantity;

a storage portion for storing therein a characteristic that a recording power of said optical beam is increased as a recording linear velocity multiplication factor is heightened as a characteristic of a recording power of said optical beam relative a recording linear velocity multiplication factor; and a system control portion which directs a recording power of an optical beam to said optical power control portion based on a characteristic of a recording power of an optical beam stored in said storage potion in accordance with a recording linear velocity multiplication factor at the time of recording on said optical disk, the apparatus characterized in that:

the storage portion stores therein a characteristic that a value of said correction quantity k varies in accordance with a linear velocity multiplication factor in case of less than a predetermined linear velocity multiplication factor as a boundary and a characteristic that a value of said correction quantity k is fixed in case of not less than said velocity multiplication factor as a characteristic of said correction quantity k relative to a recording linear velocity multiplication factor, and the system control portion performs control to direct a correction quality k to said strategy portion based on the characteristic of said correction quantity stored in said storage portion.

65. The optical disk recording apparatus according to claim 64, wherein said storage portion stores therein a characteristic of said correction quantity k relative to said recording linear velocity multiplication factor in accordance with each disk type; and said system control portion discriminates a disk type and executes control for directing said correction quantity k to said strategy portion based on a corresponding characteristic among characteristics of respective correction quantities k stored in said storage portion.

66. The optical disk recording apparatus according to claim 64, wherein said system control portion issues a command for driving said disk servo with an appropriate position on said optical disk in the radial direction as a boundary by constant angular velocity control on an inner peripheral side thereof and for driving the same on an outer peripheral side by constant linear velocity with a linear velocity multiplication factor final value in said constant angular velocity control.

67. The optical disk recording apparatus according to claim 66, further comprising a time information reading portion for reading time information from a wobble of said optical disk, wherein said system control portion calculates a linear velocity at each point in time based on a umber of revolutions of said constant angular velocity control and said time information read from said wobble of said optical disk, and performs constant linear velocity control on said outer peripheral side to execute recording on and after attainment of said linear velocity to a predetermined value.

\* \* \* \* \*

UNITED STATES PATENT AND TRADEMARK OFFICE
CERTIFICATE OF CORRECTION

PATENT NO. : 6,925,042 B2
DATED : August 2, 2005
INVENTOR(S) : Yukihisa Nakajo

It is certified that error appears in the above-identified patent and that said Letters Patent is hereby corrected as shown below:

Title page,
Item [30], Foreign Application Priority Data, replace "May 31, 2001" with
-- May 31, 2000 --.

Signed and Sealed this

Fourth Day of October, 2005

JON W. DUDAS
*Director of the United States Patent and Trademark Office*